(12) United States Patent
Kawasaki

(10) Patent No.: US 7,126,243 B2
(45) Date of Patent: Oct. 24, 2006

(54) SUPPORTING MECHANISM OF MICRO GRAVITY ROTATING APPARATUS

(75) Inventor: Shuichi Kawasaki, Nagoya (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 420 days.

(21) Appl. No.: 10/169,666

(22) PCT Filed: Nov. 13, 2001

(86) PCT No.: PCT/JP01/09911

§ 371 (c)(1),
(2), (4) Date: Jul. 8, 2002

(87) PCT Pub. No.: WO02/42154

PCT Pub. Date: May 30, 2002

(65) Prior Publication Data

US 2002/0190592 A1    Dec. 19, 2002

(30) Foreign Application Priority Data

| Nov. 22, 2000 | (JP) | ............................. 2000-356518 |
| Dec. 8, 2000 | (JP) | ............................. 2000-374362 |
| Sep. 5, 2001 | (JP) | ............................. 2001-269398 |
| Sep. 6, 2001 | (JP) | ............................. 2001-270448 |

(51) Int. Cl.
H02K 7/09        (2006.01)

(52) U.S. Cl. ...................... 310/90.5; 310/51
(58) Field of Classification Search .............. 310/90.5, 310/51, 81, 90
See application file for complete search history.

(56) References Cited

U.S. PATENT DOCUMENTS 3,473,852 A   10/1969  Lyman
3,663,075 A * 5/1972   Kronenberg .............. 310/90.5

(Continued)

FOREIGN PATENT DOCUMENTS

| DE | 3844563 A1 | 11/1989 |
| DE | 19738715 A1 | 4/1998 |
| JP | 63-20297 | 1/1988 |
| JP | 5-45204 | 2/1993 |
| JP | 6-217663 | 8/1994 |
| JP | 2000-88627 | 3/2000 |
| SU | 1299522 | 3/1987 |
| SU | 1712691 | 2/1992 |

OTHER PUBLICATIONS

Patent Abstracts of Japan, vol. 0185, No. 82 (C-1270), Nov. 8, 1994 & JP 6 217663 A (Mitsubishi Heavy Ind Ltd), Aug. 9, 1994.

*Primary Examiner*—Thanh Lam
(74) *Attorney, Agent, or Firm*—Wenderoth, Lind & Ponack, L.L.P.

(57) ABSTRACT

A rotator supporting mechanism in a microgravitational rotating apparatus includes a magnetic bearing of the rotator so as to effect a vibration control. Recess portions 10a, 10b are provided in a casing 10. Coils 1, 2 of the magnetic bearings 11, 12 and vibration sensors 3, 4 are arranged in the recess portions 10a, 10b being fitted to the casing 10 side. A rotary shaft 30 has its upper end inserted into the recess portion 10a and its lower end inserted into the recess portion 10b and connected to a motor 13. Both ends of the rotary shaft 30 are supported by a magnetic force. Arms 24–27, extending horizontally along X and Y axes, each have one end fitted to the rotary shaft 30 and the other end fitted with experimental boxes 20–23. Objects such as plants and animals, etc. are placed in the boxes 20–23 and, while they are rotated in space, experiments are performed. When a vibration occurs in the rotary shaft 30 due to weight imbalances between each of the boxes 20–23, the vibration is detected by the vibration sensors 3, 4 to thereby control exciting current of the coils 1, 2, so that the vibration is controlled.

25 Claims, 19 Drawing Sheets

U.S. PATENT DOCUMENTS

| | | | | |
|---|---|---|---|---|
| 3,761,148 A | * | 9/1973 | Grosbard | 310/90.5 |
| 3,860,300 A | * | 1/1975 | Lyman | 310/90.5 |
| 3,934,950 A | * | 1/1976 | Kuhlmann | 310/90.5 |
| 4,037,886 A | * | 7/1977 | Boden et al. | 310/90.5 |
| 4,465,949 A | * | 8/1984 | Knauff | 310/81 |
| 4,709,362 A | * | 11/1987 | Cole | 367/189 |
| 4,841,184 A | | 6/1989 | Chen et al. | |
| 5,126,610 A | | 6/1992 | Fremerey | |
| 5,209,326 A | | 5/1993 | Harper | |
| 5,294,854 A | * | 3/1994 | Trumper | 310/90.5 |

* cited by examiner

SUPPORTING MECHANISM OF MICRO GRAVITY ROTATING APPARATUS

BACKGROUND OF THE INVENTION

1. Field of the Invention

The present invention relates generally to a rotator supporting mechanism in a microgravitational rotating apparatus performing experiments in space and more particularly to a rotator supporting mechanism comprising a bearing, such as a magnetic bearing, to thereby actively control vibrations occurring in the rotator to spread therearound.

2. Description of Related Art

FIG. 20 is a schematic plan view showing a prior art example of a rotating apparatus currently used for experiments in space. In FIG. 20, a rotating device 60, such as a motor, has four supporting members 61, 62, 63, 64 fitted thereto extending radially. Experimental boxes 70, 71, 72, 73 are fitted to respective ends of the supporting members 61–64 and experimental objects, such as plants, are contained in the experimental boxes 70–73. In the microgravitational state, the rotating apparatus is driven by the rotating device 60 to rotate at a slow speed of about 1 rotation/second. Experiments using the objects are carried out in the experimental boxes 70–73 while rotating.

In the mentioned rotating apparatus, the experimental boxes 70–73 are fitted to the ends of the supporting members 61–64, so that the end portions thereof become large in shape. Also, while the rotating apparatus itself is symmetrical around the rotating axis, the experimental objects of different kinds and different sizes are contained in the experimental boxes, and weight imbalances are caused between the experimental objects so contained. Hence, by the rotation, vibrations occur in a rotary shaft as well as in the supporting members 61–64 and the experimental boxes 70–73, thereby moving the experimental objects or otherwise negatively influencing the experiments.

In the prior art rotating apparatus used in space, as described above, vibrations (and resulting reaction forces) occur during the rotation which are transmitted to arms, like the supporting members, and the experimental boxes, that constitute a rotator, and negatively affects the experimental objects.

Also, the vibrations spread to the surrounding environment via the rotary shaft and negatively affects the surrounding space equipment and apparatus as well as the control thereof. The problems caused by such vibrations can be solved by structural means to the extent that the vibrations are steady-state vibrations that can be known beforehand. But if the vibrations accompany changes of arbitrarily occurring vibration modes, countermeasures therefor are difficult and control thereof is also limited. Thus, any countermeasures to prevent these vibrations are desired.

As mentioned above, the vibrations occurring in space are to be avoided to the extent possible and, for this purpose, studies are currently carried out so as to use an elastic bearing, such as one comprising a spring, as a bearing of the rotary shaft and also so as to suppress vibrations of the shaft by controlling exciting current of a coil in a magnetic bearing. However, an effective vibration control means has not been definitively obtained yet.

SUMMARY OF THE INVENTION

It is therefore an object of the present invention to provide a rotator supporting mechanism in a microgravitational rotating apparatus that employs a magnetic bearing as a bearing of a rotary shaft for effecting an active vibration control. By using an active vibration control, arbitrary vibrations occurring the rotating apparatus in the space which would otherwise spread to the surrounding environment via the rotary shaft may be actively controlled and arbitrary modes of the vibrations may be suppressed.

It is also an object of the present invention to provide a rotator supporting mechanism in a microgravitational rotating apparatus that employs a magnetic coil provided around a rotary shaft of a rotator or provided in a bearing of the rotary shaft for effecting an active vibration control. The active vibration control is performed by changing control inputs corresponding to changes in the vibration characteristics or in the natural frequency so that arbitrary vibrations occurring in the rotating apparatus in space to spread which would otherwise the surrounding environment via the rotator may be actively controlled and arbitrary modes of the vibration may be suppressed.

It is another object of the present invention to provide a rotator supporting mechanism in a microgravitational rotating apparatus in which a magnetic bearing of the microgravitational rotating apparatus is improved to comprise an active vibration control magnetic bearing and a bias control magnetic bearing. The active vibration control magnetic bearing and the bias control magnetic bearing are separate from each other to thereby effectively control even a very small vibration so that no vibration (or resulting reaction forces)may spread to a casing side via the magnetic bearings and no bad influence may be given on equipment or apparatus outside of the casing.

Also, it is still another object of the present invention to provide a rotator supporting mechanism in a microgravitational rotating apparatus in which a support mechanism by means of a magnetic bearing is added with an elastic support mechanism. By using this feature, even while the magnetic bearing is supplied with no electric power, a rotary shaft may be supported at a central position and, even at the time operation starts, no collision or hitting of the rotary shaft occurs.

In order to achieve the mentioned objects, the present invention provides the following aspects(1) to (23).

(1) A rotator supporting mechanism in a microgravitational rotating apparatus in which the rotator comprises a rotary shaft provided within a casing of the microgravitational rotating apparatus. The rotary shaft has at least one end supported to the side of the casing by a bearing of the rotator supporting mechanism so as to be rotationally driven by a motor. A plurality of arms, extending radially, each have one end fitted to a circumferential periphery of the rotary shaft, and the other end of each arm is fitted to a corresponding box in a plurality of boxes. A gravitational, or gravity-adding, object is placed into each box. The rotator supporting mechanism comprises a control unit that controls a position holding force of the bearing for holding the rotary shaft so as to effect a vibration control of the rotary shaft.

(2) A rotator supporting mechanism as mentioned in (1) above, in which the bearing is a magnetic bearing having a coil, and is fitted to the casing side such that it is arranged closely to a circumferential periphery of the rotary shaft. The rotator supporting mechanism further comprises a plurality of vibration sensors fitted to the casing side such that they are arranged closely to the coil as well as to the circumferential periphery of the rotary shaft. The control unit takes displacement signals sent from the plurality of vibration sensors to thereby detect vibration of the rotary shaft from displacement of the rotary shaft, and controls exciting current of the coil so as to effect the vibration control.

(3) A rotator supporting mechanism as mentioned in (2) above, in which the plurality of vibration sensors are fitted to both the casing side and the rotary shaft, or only to the rotary shaft instead of being fitted to casing side. The control unit takes the displacement signals sent from the plurality of vibration sensors and controls the exciting current of the coil so as to effect an active vibration control of the rotary shaft.

(4) A rotator supporting mechanism as mentioned in (2) or (3) above, in which the rotator supporting mechanism further comprises a distance sensor, such as a gap sensor or displacement sensor, fitted to the casing side such that it is arranged closely to the coil. The control unit measures a distance between the rotary shaft and the gap sensor or displacement sensor and controls the exciting current of the coil so as to effect an active vibration control of the rotary shaft.

(5) A rotator supporting mechanism as mentioned in (2) or (3) above, in which the rotator supporting mechanism further comprises an optical sensor or laser displacement gauge fitted to the casing side such that it is arranged closely to the coil. The control unit measures a distance between the rotary shaft and the optical sensor or laser displacement gauge and controls the exciting current of the coil so as to effect an active vibration control of the rotary shaft.

(6) A rotator supporting mechanism as mentioned in (4) above, in which the rotator supporting mechanism, instead of comprising the plurality of vibration sensors, comprises only the gap sensor or displacement sensor (distance sensor) fitted to the casing side such that it is arranged closely to the coil. The control unit measures the distance between the rotary shaft and the gap sensor or displacement sensor or measures the displacement of the rotary shaft to thereby detect the vibration of the rotary shaft and controls the exciting current of the coil so as to effect the active vibration control of the rotary shaft.

(7) A rotator supporting mechanism as mentioned in any one of (2) to (4) above, in which the control unit takes the displacement signals from the plurality of vibration sensors to thereby detect the vibration of the rotary shaft. The control unit then compares the vibration with a predetermined vibration demand value and controls the exciting current of the coil so that the vibration may be suppressed below the vibration demand value.

(8) A rotator supporting mechanism as mentioned in any one of (4) to (6) above, in which the control unit, based on signals from any one of the gap sensor, displacement sensor, optical sensor and laser displacement gauge, measures the distance to the rotary shaft or the displacement of the rotary shaft to thereby detect the vibration of the rotary shaft. The control unit then compares a spectrum of the vibration with a predetermined spectrum demand value and controls the exciting current of the coil so that the vibration may be actively suppressed below the spectrum demand value.

(9) In a rotator supporting mechanism as mentioned in any one of (2) to (8) above, if and while the control unit detects acceleration or amplitude of the vibration in excess of a demand value, the control unit effects the vibration control of the rotary shaft so that the vibration may be suppressed below the demand value concentrically with respect to a vibration range in excess of the demand value.

(10) In a rotator supporting mechanism as mentioned in any one of (2) to (9) above, if and while the control unit detects acceleration or amplitude of the vibration in excess of a demand value, the control unit effects the vibration control of the rotary shaft so that the vibration may be suppressed below the demand value concentrically with respect to a vibration range in excess of the demand value. At the same time the control unit stores information regarding the vibration, such as frequency, acceleration and/or amplitude of the vibration in excess of the demand value so that the information may be reflected on a control law that enables subsequent active vibration controls.

(11) In a rotator supporting mechanism as mentioned in any one of (2) to (9) above, if and while the control unit detects acceleration or amplitude of the vibration in excess of a demand value, the control unit effects the vibration control of the rotary shaft so that the vibration may be suppressed below the demand value concentrically with respect to a vibration range in excess of the demand value. At the same time the control unit compares information regarding frequency, acceleration and/or amplitude of the vibration in excess of the demand value with previously stored vibration data so that a cause of the vibration may be determined.

(12) In a rotator supporting mechanism as mentioned in any one of (2) to (9) above, if and while the control unit detects acceleration or amplitude of the vibration in excess of a demand value, the control unit effects the vibration control of the rotary shaft so that the vibration may be suppressed below the demand value concentrically with respect to a vibration range in excess of the demand value. At the same time the control unit compares information regarding frequency, acceleration and/or amplitude of the vibration in excess of the demand value with previously stored vibration data so that a cause of the vibration may be determined and learned to be reflected on a control law that is owned by the control unit to thereby enhance a control ability.

(13) A rotator supporting mechanism as mentioned in (1) above, in which the bearing comprises a bearing supporting both ends of the rotary shaft and a vibration control coil arranged around the rotary shaft with a predetermined gap being maintained between the vibration control coil and the rotary shaft. The rotator supporting mechanism further comprises a plurality of vibration sensors fitted to the casing side such that they are arranged closely to the vibration control coil as well as equally spaced around the rotary shaft with a predetermined gap being maintained between the vibration sensors and the rotary shaft. The control unit takes displacement signals of the gap sent from the plurality of vibration sensors and, if the displacement signals are in excess of a predetermined value, controls exciting current of the vibration control coil. In controlling the excitation of the vibration control coil, the control unit puts out signals of which amplitude is changed by combining a linear signal and a non-linear signal corresponding to sizes of the displacement signals so as to effect an active vibration control.

(14) A rotator supporting mechanism as mentioned in (13) above, in which the bearing supporting both ends of the rotary shaft is a magnetic bearing and the magnetic bearing not only functions to support the rotary shaft but also functions as the vibration control coil.

(15) A rotator supporting mechanism as mentioned in (13) above, in which the vibration control coil comprises coil portions divided corresponding to number and position of the plurality of vibration sensors. The control unit judges a position of the vibration sensor of which the displacement signal is the largest out of the displacement signals sent from the plurality of vibration sensors and controls exciting current of that coil portion of the vibration control coil corresponding to the position of the vibration sensor.

(16) A rotator supporting mechanism as mentioned in (14) above, in which the magnetic bearing comprises coil portions divided corresponding to number and position of the plurality of vibration sensors. The control unit judges a position of the vibration sensor of which the displacement signal is the largest out of the displacement signals sent from the plurality of vibration sensors and controls exciting current of that coil portion of the magnetic bearing corresponding to the position of the vibration sensor.

(17) A rotator supporting mechanism as mentioned in (15) or (16) above, in which the control unit measures time-wise changes of the displacement signals sent from the plurality of vibration sensors, computes a change rate and an inclination of the changes of the respective time-wise changes. Based on any of the computation results, the control unit adjusts the exciting force of the magnetic bearing so as to effect an appropriate vibration control.

(18) A rotator supporting mechanism as mentioned in (2) above, in which the magnetic bearing supporting both ends of the rotary shaft comprises a vibration control magnetic bearing and a bias control magnetic bearing that effects a position holding of the rotary shaft.

(19) A rotator supporting mechanism as mentioned in (2) above, in which the magnetic bearing supporting both ends of the rotary shaft comprises two vibration control magnetic bearings and a bias control magnetic bearing arranged between the two vibration control magnetic bearings.

(20) A rotator supporting mechanism as mentioned in (2) above, in which the magnetic bearing supporting both ends of the rotary shaft comprises two bias control magnetic bearings that effect a position holding of the rotary shaft and a vibration control magnetic bearing arranged between the two bias control magnetic bearings.

(21) A rotator supporting mechanism as mentioned in any one of (18) to (20) above, in which the vibration control magnetic bearing functions only to effect the vibration control of the rotary shaft. The bias control magnetic bearing functions to effect the position holding of the rotary shaft as well as to effect a position control of the rotary shaft so as to weaken the position holding force of the rotary shaft while the vibration control magnetic bearing is effecting the vibration control.

(22) A rotator supporting mechanism as mentioned in (2) above, in which the magnetic bearing supporting both ends of the rotary shaft is supported to the casing side via an elastic support mechanism that is arranged on an outer circumferential side of the magnetic bearing. A shaft supporting force of the elastic support mechanism is set to a value smaller than a shaft supporting force of the magnetic bearing.

(23) A rotator supporting mechanism as mentioned in (22) above, in which the elastic support mechanism comprises a main body holding the magnetic bearing for supporting the rotary shaft and a plurality of springs connecting an outer circumferential surface of the main body and the casing side.

(24) A rotator supporting mechanism as mentioned in (22) above, in which the elastic support mechanism comprises a main body holding the magnetic bearing for supporting the rotary shaft and an elastic member, made of an elastic material, connecting an outer circumferential surface of the main body and the casing side.

In aspect (1) above, experimental objects that add gravity in the microgravitational environment in space are placed in the plurality of boxes and the boxes rotate around the rotary shaft. The objects are, for example, plants or animals, and imbalances in the weight are caused between each of the boxes. Hence, when the rotator rotates, vibrations occur due to differences in the acceleration. The control unit controls the position holding force of the bearing for holding the rotary shaft to thereby suppress displacements of the rotary shaft caused by the vibrations. Thus, the vibration of the rotator, that comprises the rotary shaft, the arms and the boxes, can be controlled to be reduced to a minimum.

In aspect (2) above, the rotary shaft has at least one end supported by the magnetic bearing. If vibrations occur in the rotary shaft due to imbalances in the objects in the boxes or imbalances in the system, the vibrations are detected as displacements of the rotary shaft by the vibration sensors arranged closely to the circumferential periphery of the rotary shaft. Signals thereof are inputted into the control unit. The control unit detects the vibration of the rotary shaft based on these displacement signals and controls the exciting current of the coil of the magnetic bearing so as to effect the vibration control of the rotary shaft. Thus, the vibrations are controlled to be suppressed and is prevented from spreading to the surrounding environment in space via the bearing of the rotary shaft.

In aspect (3) above, the vibration sensors are fitted to both the casing side and the rotary shaft or fitted to the rotary shaft. In aspect (4) above, in addition to the vibration sensors, the gap sensor or displacement sensor is provided, and in aspect (5) above, the optical sensor or laser displacement gauge is provided. Thus, the detection of the vibration of the rotary shaft can be done with a higher accuracy.

In aspect (6) above, instead of the vibration sensors of aspect (4) above, the construction is made so as to detect the vibration only by the gap sensor or displacement sensor. Hence, the construction of the sensors can be simplified according to the sensing purpose or the objects in the boxes.

In aspect (7) above, if the control unit detects the vibration of the rotary shaft, it compares the vibration with the previously set vibration demand value corresponding to the vibration to which a rotating device is to be suppressed and controls the exciting current of the coil so that the vibration may be suppressed below the demand value. Hence, negative influences on other equipment or apparatus in space can be avoided. In aspect (8) above, the control unit detects the vibrations based on the displacements of the rotary shaft detected by the gap sensor, the displacement sensor, the optical sensor or the laser displacement gauge, compares the vibration with the spectrum demand value that is set with respect to the vibration spectrum and effects the control so as to suppress the vibration below the demand value. In aspect (9) above, if the detected vibration acceleration or amplitude is in excess of the demand value, the control unit effects the vibration control so that the vibration may be suppressed below the demand value concentrically with respect to the vibration range in excess of the demand value. Thus, the vibration can be instantaneously suppressed.

In aspect (10) above, the control unit stores the information of the frequency, acceleration, amplitude, etc. of the detected vibration to be reflected on the control law of the subsequent vibration controls. In aspect (11) above, the detected vibration data are compared with the previously stored data so that the cause of the vibration may be determined. In aspect (12) above, the cause of the vibration is determined based on the result of the comparison and learned so as to be reflected on the control law. Hence, by the learning function, the vibration control becomes more accurate.

In aspect (13) above, the vibration of the rotator is detected as the displacements of the gap between the rotary shaft and the casing side by the plurality of vibration sensors arranged around the rotary shaft. The displacement signals sent from the vibration sensors are inputted into the control unit. If the displacement signals are large as compared to the predetermined value that is set to the ordinary non-vibrating state, the control unit controls the exciting current of the vibration control coil to thereby control the displacements of the gap caused by the vibration of the rotator. In this control of the vibration control coil, the control unit puts out the signals of which amplitude is changed by combining the linear signal and the non-linear signal corresponding to the sizes of the displacement signals sent from the vibration sensors. The vibration control coil is controlled by the output signals so put out by the control unit. By this control, the vibration can be optimally suppressed and converged.

In aspect (14) above, the bearing supporting both ends of the rotary shaft is a magnetic bearing which functions both as the rotary shaft supporting bearing and the vibration control coil. Hence, the structure of the vibration control system of the rotator is simplified and the vibration can be optimally suppressed and converged at both ends of the rotary shaft.

In aspect (15) above, the vibration control coil is divided into coil portions. In aspect (16) above, the coil of the magnetic bearing is also divided into coil portions. Thereby, the exciting current of the coil portion corresponding to the position where the displacement due to the vibration of the rotator is the largest is effectively controlled and thus the vibration of the rotator can be more effectively controlled.

In aspect (17) above, the control unit computes the change rate and the inclination of the changes with respect to the time-wise changes in the vibration signals sent from the vibration sensors. Corresponding to the sizes of the change rate and the inclination, the excitation of the vibration control coil is controlled. Hence, a higher accuracy of the vibration control can be realized.

In aspect (18) above, the magnetic bearing supporting both ends of the rotary shaft is constructed by the vibration control magnetic bearing that effects the active vibration control and the bias control magnetic bearing that effects the position holding. The bias control magnetic bearing holds the rotary shaft at the central position of the rotation by the magnetic force. The vibration control magnetic bearing is controlled such that, upon occurrence of the vibration of the rotary shaft, the vibration control magnetic bearing generates a magnetic force so as to weaken the position holding force of the bias control magnetic bearing to a predetermined extent to thereby mitigate the position holding force of the rotary shaft. At the same time, the control to effect the active vibration control of the rotary shaft is carried out. Thus, the vibration caused by the stiff supporting force given by the bias control magnetic bearing is mitigated and even a very small vibration is prevented from spreading outside. Hence, the vibration can be effectively controlled.

In aspect (19) above, the magnetic bearing supporting both ends of the rotary shaft is constructed by the two vibration control magnetic bearings and the bias control magnetic bearing arranged between them. Hence, like in aspect (18) above, the vibration occurring in the rotary shaft can be prevented from spreading outside of the casing. Moreover, the rotary shaft has both ends supported by the magnetic bearing having the two vibration control magnetic bearings therein that are arranged in a good balance and thus a more effective vibration control becomes possible.

In aspect (20) above, the magnetic bearing supporting both ends of the rotary shaft is constructed by the two bias control magnetic bearings and the vibration control magnetic bearing arranged between them. Hence, like in aspect (18) above, the vibration occurring in the rotary shaft can be prevented from spreading outside of the casing. Moreover, the rotary shaft has both ends supported by the magnetic bearing having therein the two bias control magnetic bearings that are arranged in a good balance and thus the position holding of the rotary shaft is ensured and a more effective vibration control becomes possible.

In aspect (21) above, while the vibration control magnetic bearing is effecting the vibration control of the rotary shaft, the exciting current of the bias control magnetic bearing is controlled so as to weaken the position holding force of the rotary shaft to a predetermined extent. Thereby, the position holding force given by the bias control magnetic bearing for holding the rotary shaft is weakened and the vibration of the rotary shaft is given an increased freedom relative to the bias control magnetic bearing. Thus, the vibration is prevented from spreading to the casing side via the bias control magnetic bearing and is effectively controlled by the vibration control magnetic bearing.

In aspect (22) above, the magnetic bearing, while supporting both ends of the rotary shaft, is supported by the elastic support mechanism and thereby the rotary shaft can be supported at the central position of the rotation, even while the magnetic bearing is being supplied with no power. Also, the shaft supporting force of the elastic support mechanism is set to be smaller than that of the magnetic bearing. On the other hand, the shaft supporting force of the elastic support mechanism is set so as to have a minimum shaft supporting force to support the rotary shaft at the central position while the magnetic bearing is being supplied with no power and no supporting force of the magnetic bearing is being generated. Hence, the vibration occurring in the rotary shaft is prevented from spreading to the casing side via the magnetic bearing and the vibration is effectively controlled by the magnetic bearing.

In aspect (23) above, the elastic support mechanism is constructed by the main body holding the magnetic bearing and the plurality of springs connecting the main body to the casing side. Also, in aspect (24) above, the elastic support mechanism is constructed by the main body holding the magnetic bearing and the elastic member, made of an elastic material, connecting the main body to the casing side. Thus, the rotary shaft can be elastically supported by a simple elastic support mechanism. The elastic support may be comprised not only of an elastic material such as rubber, sponge rubber or urethane, but also of a supporting means using a fluid material, a fluid bearing, etc.

BRIEF DESCRIPTION OF THE DRAWINGS

FIGS. 1(a) to (c) show a rotator supporting mechanism in a microgravitational rotating apparatus of a first embodiment according to the present invention, wherein FIG. 1(a) is a cross sectional side view, FIG. 1(b) is a cross sectional view seen from arrows on line A—A of FIG. 1(a) and FIG. 1(c) is a cross sectional view seen from arrows on line B—B of FIG. 1(a).

FIGS. 6(a) to (c) show an active control system as a rotator supporting mechanism in a microgravitational rotating apparatus of a third embodiment according to the present invention, wherein FIG. 6(a) is a cross sectional side view, FIG. 6(b) is a cross sectional view seen from arrows on line C—C of FIG. 6(a) and FIG. 6(c) is a cross sectional view seen from arrows on line D—D of FIG. 6(a).

FIG. 8(c) shows a pattern having only a non-linear one.

FIGS. 11(a) and (b) show cross sectional portions of the rotator supporting mechanism of the fifth embodiment shown in FIG. 10, wherein FIG. 11(a) is a cross sectional view seen from arrows on line E—E of FIG. 10

FIGS. 12(a) and (b) are signal timing charts showing a vibration control state with respect to the fifth embodiment, wherein FIG. 12(a) shows an example in which a bias control magnetic bearing is not controlled and FIG. 12(b) shows an example in which the bias control magnetic bearing is controlled.

FIGS. 18(a) and (b) show a rotator supporting mechanism in a microgravitational rotating apparatus of a ninth embodiment according to the present invention, wherein FIG. 18(a) is a cross sectional view taken on a line substantially the same as the line G—G of FIG. 15

DETAILED DESCRIPTION OF PREFERRED EMBODIMENTS

Figure 1:
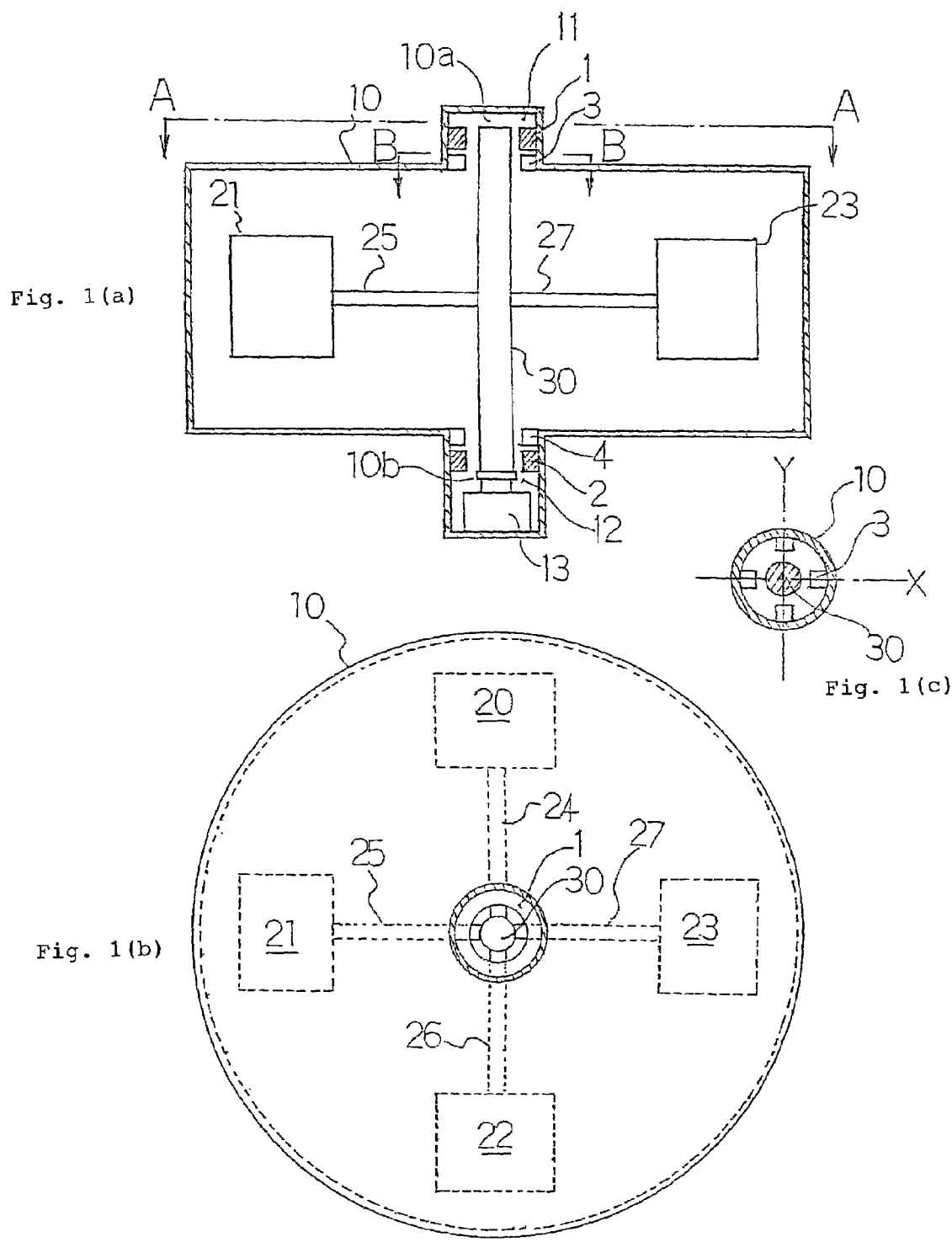

Herebelow, the invention will be described more concretely based on embodiments with reference to appended drawings.

In FIG. 1(a), numeral 10 designates a casing that contains therein an entire rotator. Within the casing 10, recess portions 10a, 10b project outwardly from upper and lower outer walls of the casing 10. Magnetic bearings 11, 12 are arranged on inner circumferential wall surfaces of the recess portions 10a, 10b, respectively. The magnetic bearings 11, 12 comprise coils 1, 2 for excitation that are arranged on the inner circumferential wall surfaces of the recess portions 10a, 10b, respectively, so as to form the magnetic bearings. Numerals 3, 4 designate vibration sensors which are arranged on inner casing sides of the coils 1, 2 in the recess portions 10a, 10b, respectively. The vibration sensors 3, 4 detect displacements of gaps between the sensors 3, 4 and a rotary shaft 30 to thereby detect vibration of the rotary shaft 30, as will be described later.

The vibration sensors 3, 4 are arranged, as shown in FIG. 1(c), symmetrically around the rotary shaft 30 in four pieces so that vibration displacements of the rotary shaft 30 may be detected in the directions of ±X and ±Y axes. Also, as will be described later, the vibration sensors may be arranged so that displacements of the rotary shaft 30 in the direction of ±Z axis, that is, in the axial direction of the rotary shaft, may be detected. It is to be noted that the vibration sensors 3, 4 may be fitted not only to the casing 10 side but also to the rotary shaft 30 side or they may be fitted only to the rotary shaft 30 side.

Numeral 30 designates the rotary shaft, as mentioned above, that has its upper and lower ends arranged in the recess portions 10a, 10b, respectively, such that the upper end is supported by the magnetic bearing 11 and the lower end is supported by the magnetic bearing 12 and is connected to a motor 13. Thus, the rotary shaft 30 is supported in a space by the magnetic force with a predetermined gap being maintained between the rotary shaft 30 and the coils 1, 2 to be rotatable by the motor 13. As shown in FIG. 1(b), four arms 24, 25, 26, 27 each have one end fixed to an outer circumferential periphery of the rotary shaft 30 extending horizontally in the directions of X and Y axes and have the other end fitted with experimental boxes or containers (hereinafter simply referred to as "the experimental boxes") 20, 21, 22, 23.

It is to be noted that the rotary shaft 30 may be constructed by a permanent magnet or an exciting coil so as to be supported by a magnetic repulsive force or attractive force. Also, the magnetic bearing may be provided not on both ends of the rotary shaft 30 but on only one end thereof.

In the rotator comprising the rotary shaft 30, the arms 24–27 and the experimental boxes 20–23, mentioned above, experimental objects such as plants, animals, etc. are placed in the experimental boxes 20–23. In space, the motor 13 is driven to rotate the experimental boxes 20–23 at a slow speed so that experiments may be carried out in which a growing state of the plants, a living state of the animals, etc. can be observed in space. As the experimental boxes 20–23 contain various experimental objects having different shapes, sizes and weights differences in the acceleration caused by the imbalances in the weight between each of the experimental boxes 20–23 occur when they are rotated, which causes vibrations in the experimental boxes. These vibrations are conveyed to the rotary shaft 30 via the arms 24–27 as well as to the casing 10 via the bearing portions, which has negative effects not only on the experiments but also on the surrounding environment.

Thus, in the first embodiment, the construction is made such that the magnetic bearings 11, 12 are employed as the bearings of the rotary shaft 30 and thereby the rotary shaft 30 is supported at the casing 10 side by the magnetic force such that the rotary shaft makes no contact with a supporting portion of the casing 10. If vibrations occur in the rotary shaft 30, the vibrations are detected by the respective four vibration sensors 3, 4 arranged on the X and Y axes around both end portions of the rotary shaft 30. The vibration sensors 3, 4 detect variations caused by the vibrations in the gaps between the rotary shaft 30 and the sensors and input signals thereof into a control unit (not shown). If vibrations occur, thus causing variations in the gaps, the control unit controls the currents of the coils 1, 2 existing at the positions corresponding to the variations so that the gaps may return to their original state and thereby an active vibration control may be effected.

While illustration is omitted, the coils 1, 2 may be constructed, for example, such that in each of the coils, four mutually independent windings are arranged so that the magnetic force may act in the four directions of the X and Y axes. The control unit controls excitation of the coil existing at the position where the variation in the gap is the largest to thereby adjust the repulsive force or attractive force relative to the rotary shaft 30 for the vibration control.

Figure 2:
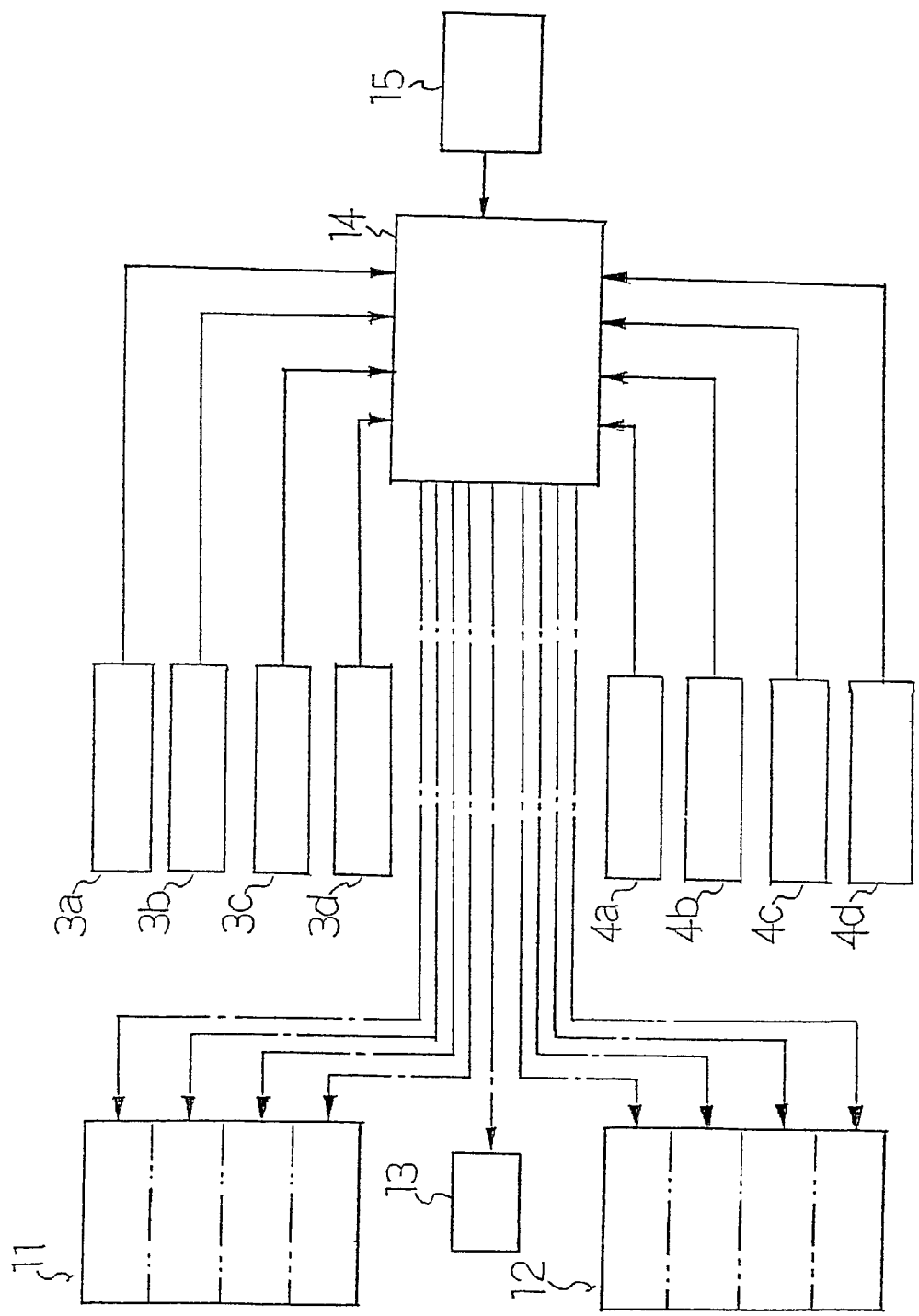
FIG. 2 is a control system diagram of the rotator supporting mechanism of the first embodiment.

FIG. 2 is a control system diagram of the rotator supporting mechanism of the first embodiment according to the present invention. The vibration sensors 3, 4 arranged at the upper and lower end portions of the rotary shaft 30 comprise vibration sensors 3a, 3b, 3c, 3d and 4a, 4b, 4c, 4d, respectively, and each of their detected signals is inputted into a control unit 14. The control unit 14 drives the motor 13 and, at the same time, monitors the vibrational displacements of the ends of the rotary shaft 30 in the four directions of the X and Y axes of the vibration sensors 3, 4. If the gaps between the sensors and the rotary shaft 30 become smaller or larger, the control unit 14 controls the exciting current of the windings of the coils 1, 2 existing at the corresponding position on the X and Y axes so as to strengthen the repulsive force or attractive force between the rotary shaft and the coils to thereby return the gaps to their original state.

Numeral 15 designates a storage unit that has previously stored data that includes demand value patterns of vibration frequency spectrum, amplitude or acceleration (vibration characteristics). In monitoring the vibration of the rotary shaft 30 by the signals from the vibration sensors 3, 4, the control unit 14 compares the vibrations with the demand value. When the vibrations become large enough to cause displacements of the rotary shaft, thus exceeding the demand value, the control unit 14 controls the exciting currents of the coils so as to reduce the vibrations and further continues the control so that the vibrations of the rotary shaft 30 fall below the demand value.

Also, if the control is performed such that the control unit compares the vibrations with the demand value to thereby learn the vibration characteristics and incorporate them into its own control laws, then the control ability can be further enhanced.

Figure 3:
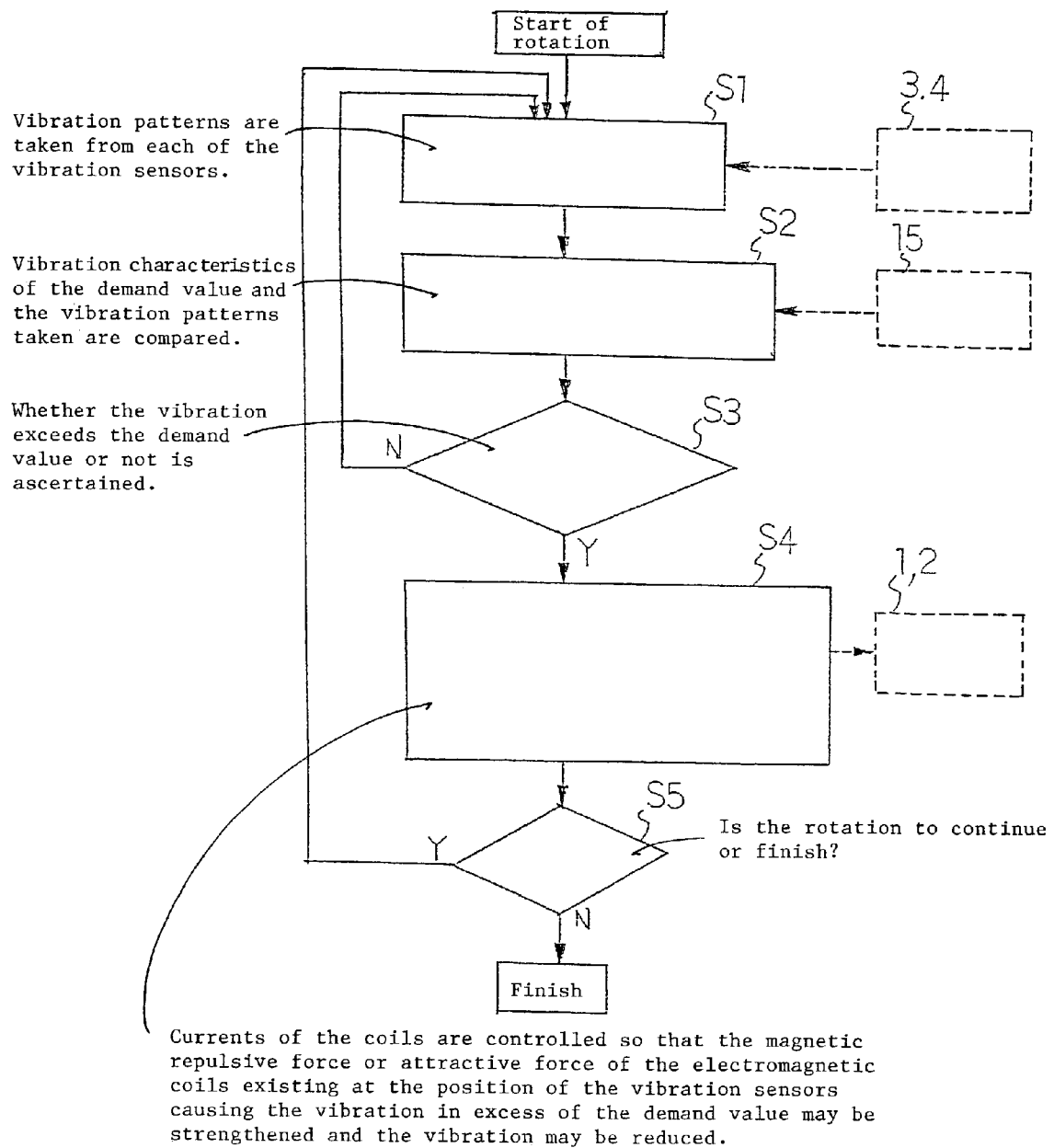
FIG. 3 is a control flow chart of the rotator supporting mechanism of the first embodiment.

In FIG. 3, steps of the control are shown by S1–S5. When the rotator starts to rotate, the control unit 14 first takes signals detected by each of the vibration sensors 3, 4(S1) and then takes data of the demand value from the storage unit 15 for comparison with the detected values of the vibrations and monitors the vibration of the rotary shaft 30 (S2). Then, the control unit 14 ascertains whether the vibrations detected by each of the sensors exceeds the demand value or not (S3). If the vibrations are smaller than the demand value, the step returns to S1 for further monitoring of the signals detected by each of the vibration sensors. If the vibrations exceed the demand value, the control unit 14 controls the currents of the windings of the coils existing at the position of the vibration sensors which detect the vibrations that exceed the demand value to thereby adjust the electromagnetic force so that the gaps between the rotary shaft, and the coils may return to their original state, thus reducing the vibrations (S4). Then, at the step S5, if the rotation is to continue, the step returns to S1 for a continued control and if the rotation is to finish, the control finishes.

Figure 4:
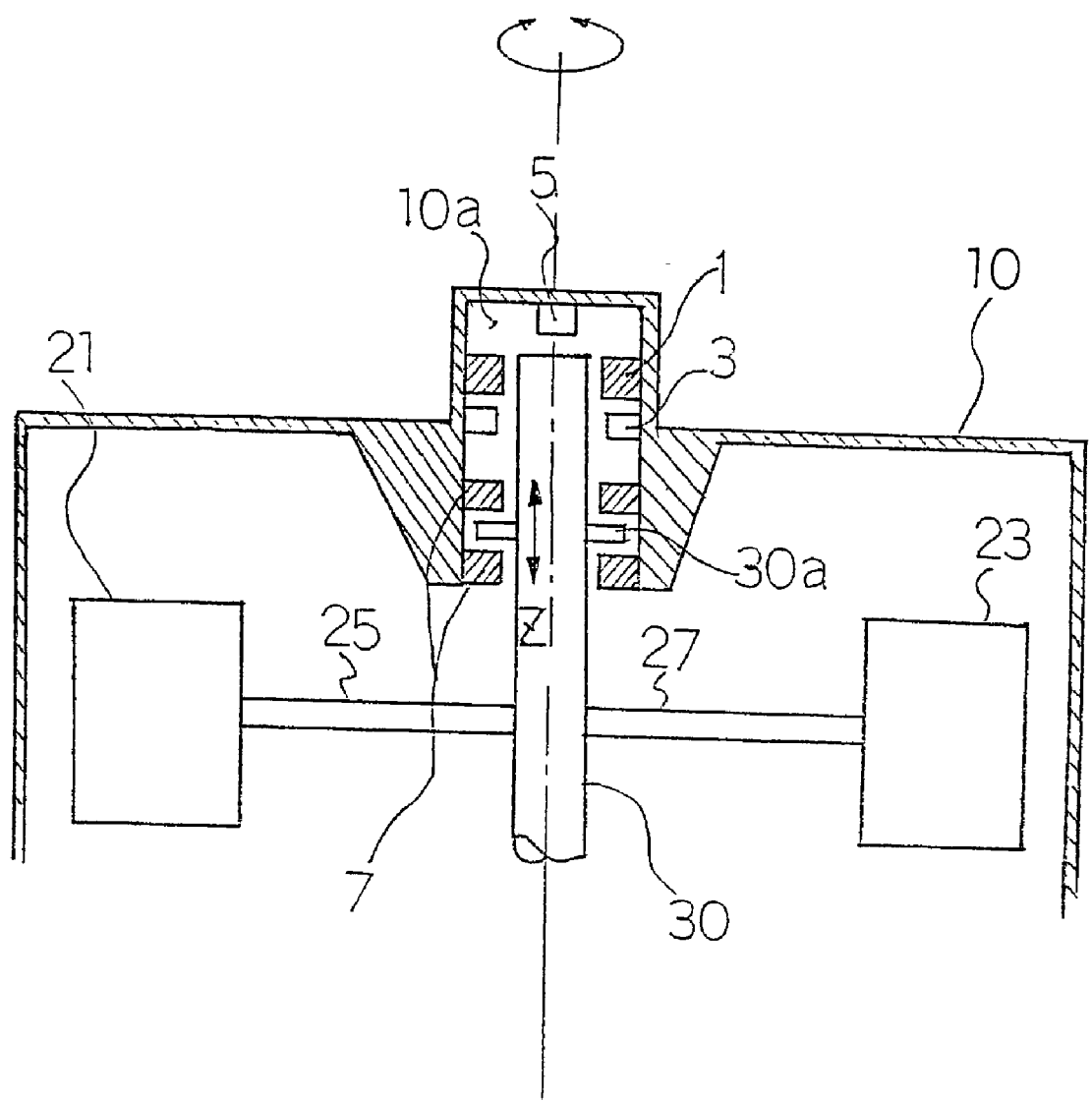
FIG. 4 is a cross sectional side view of an upper half portion of a rotator supporting mechanism in a microgravitational rotating apparatus of a second embodiment according to the present invention.

FIG. 4 is a cross sectional side view of a rotator supporting mechanism in a microgravitational rotating apparatus of a second embodiment according to the present invention, wherein only an upper half portion of the rotating apparatus is shown and illustration of a lower portion thereof is omitted. In FIG. 4, recess portions 10a, 10b (illustration of 10b is omitted) are provided on upper and lower outer walls of a casing 10. A rotary shaft 30 has both ends inserted into the recess portions 10a, 10b, respectively, to be supported by magnetic bearings, like in the case of FIG. 1. A vibration sensor 5 is fitted to an inner surface of a bottom (or ceiling) wall of the recess portion 10a so as to oppose an upper end face of the rotary shaft 30. Also, an annular fin-like fixing plate 30a is fitted to the rotary shaft 30 at a mid position of the upper end portion of the rotary shaft 30. Coils 7 are fitted to the casing 10 side so as to hold the fixing plate 30a therebetween with a predetermined gap being maintained between the fixing plate 30a and the coils 7. Construction of other portions is the same as that of the first embodiment shown in FIG. 1 and a description thereof is omitted.

It is to be noted that the above-mentioned fixing plate 30a may be constructed by a permanent magnet or an exciting coil to generate a magnetic repulsive force or attractive force to thereby strengthen the repulsive force or attractive force relative to the coils 7.

In the construction as mentioned above, displacements of the rotary shaft 30 caused by the vibrations in the directions of ±X and ±Y axes are detected by the vibration sensors 3, 4 to be inputted into the control unit. Then, like in the first embodiment shown in FIGS. 1 and 2, excitation of the coils 1, 2 is controlled so as to counteract the displacements of the rotary shaft in the direction of ±X and ±Y axes so that the vibrations may be reduced.

In the second embodiment, in addition to the above construction, displacements of the rotary shaft 30 in the axial direction, or in the direction of ±Z axis, are detected by the vibration sensor 5 to be inputted into the control unit. Excitation of the coils 7 is controlled so as to counteract the displacements in the direction of ±Z axis for reducing the vibrations. Thus, the displacements caused by the vibrations in the directions of ±X, ±Y and ±Z axes are detected by the vibration sensors 3, 4 and 5 and the vibrations in the three dimensional directions can be accurately controlled. It is to be noted that the control system of the second embodiment is basically the same as that described with respect to FIG. 2 and a description and illustration thereof is omitted.

Figure 5A:
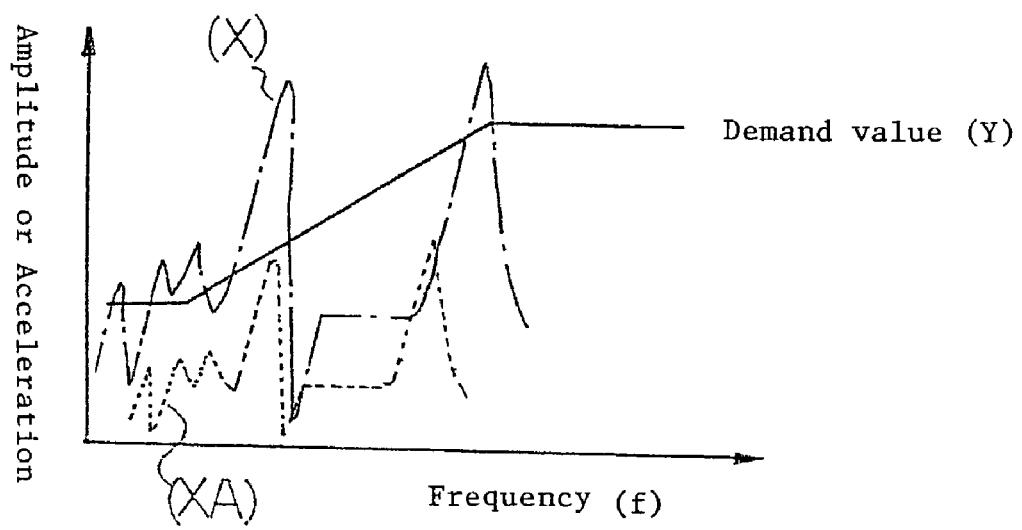
FIGS. 5(a) and (b) are graphs showing two examples of a demand value and a control effect of a vibration control in the rotator supporting mechanisms of the first and the second embodiments.

FIGS. 5(a) and (b) are graphs showing two examples of the demand value and the control effect of the vibration control in the rotator supporting mechanisms of the first and the second embodiments as described above. FIG. 5(a) shows an example where the vibration is of the rotary shaft 30 having a natural vibration of a single natural value (X). In this example, a rotator supporting mechanism having magnetic bearings of the present invention is used for the demand value (Y) and thereby the vibration is controlled to become patterns of the vibration (XA) that are below the demand value (Y).

Figure 5B:
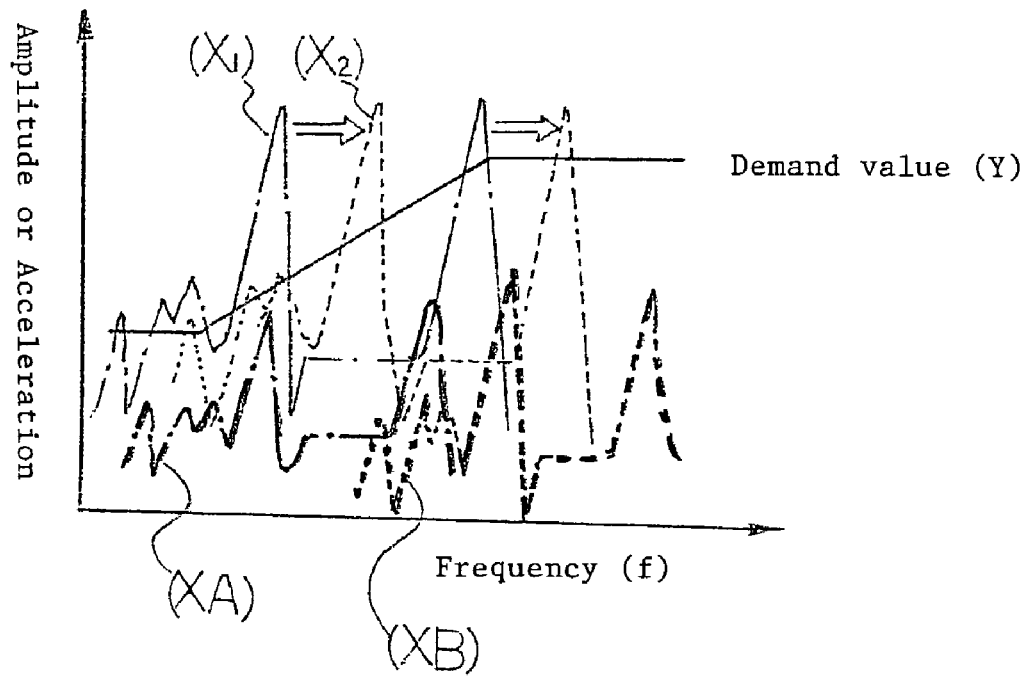

FIG. 5(b) shows an example where patterns of the natural frequency change to those $(X_2)$ from those $(X_1)$. This is such a case, for example, where the plants in the experimental boxes grow to thereby change the vibration characteristics of the experimental boxes. By also applying the rotator supporting mechanism of the present invention to this example, the natural vibration ($X_1$) is controlled to become patterns of the vibration (XA) that are below the demand value (Y) and the natural vibration ($X_2$) is controlled to become patterns of the vibration (XB) that are also below the demand value (Y).

In the first and second embodiments as described above, while the magnetic bearings are employed to control the exciting current of the coils for controlling the vibrations, such a vibration control is done by vibration control inputs of a linear type or a simple non-linear type. Hence, an effective vibration control cannot necessarily be achieved and there is a limitation in controlling the changes in the vibration modes that arise arbitrarily. Therefore, further improvement in this regard is desired. Thus, a third embodiment according to the present invention will be described next.

Figure 6A:
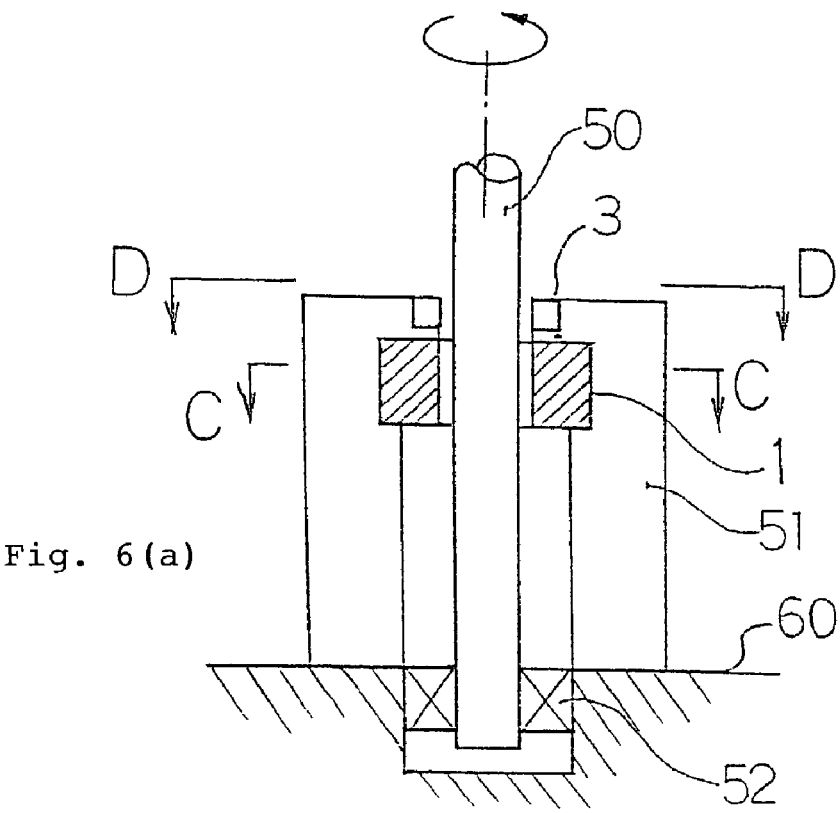
Figure 6B:
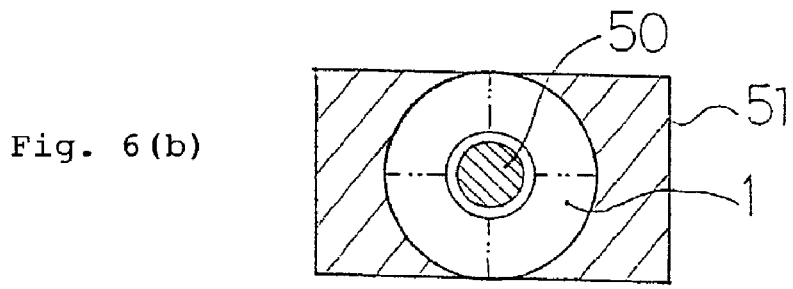
Figure 6C:
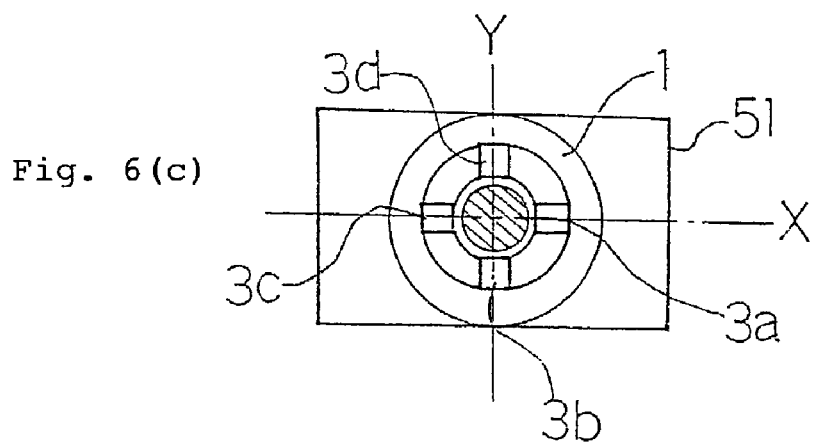

FIGS. 6(a) to (c) show an active control system as a rotator supporting mechanism in a microgravitational rotating apparatus of a third embodiment according to the present invention, wherein FIG. 6(a) is a cross sectional side view, FIG. 6(b) is a cross sectional view seen from arrows on line C—C of FIG. 6(a) and FIG. 6(c) is a cross sectional view seen from arrows on line D—D of FIG. 6(a). In FIG. 6(a), a rotary shaft 50 is supported by a structural part 60 via a bearing 52 so as to be rotatable in the microgravitational space. It is to be noted that while the rotary shaft 50 is shown only by illustration of a lower end portion thereof, an upper end portion thereof is also supported likewise by the bearing. A coil 1 for the vibration control purpose surrounds the rotary shaft 50 with a predetermined gap being maintained between the coil 1 and the rotary shaft 50 and is fitted to a supporting member 51. Also, a vibration sensor 3 is arranged slightly above the coil 1 with a predetermined gap being maintained between the vibration sensor 3 and the rotary shaft 50 and is likewise fitted to the supporting member 51.

In FIG. 6(b), the coil 1, surrounding the rotary shaft 50 with the predetermined gap therebetween, is constructed by four coils, as will be described below, so that displacements of the rotary shaft 50 caused by the vibrations may be counteracted by the magnetic force. Also, in FIG. 6(c), the vibration sensor 3, arranged slightly above the coil 1, comprises four vibration sensors 3a, 3b, 3c, 3d, that are arranged in the directions of the ±X and ±Y axes, being equally spaced between each of them, around the rotary shaft 50 with the predetermined gaps being maintained between the respective vibration sensors and the rotary shaft. If the rotary shaft 50 is displaced by the vibrations, changes in the gaps between the rotary shaft 50 and the vibration sensors 3a–3d are detected by the vibration sensors 3a–3d and the vibration directions are also detected from the positional changes of the rotary shaft 50 at the four positions of the vibration sensors 3a–3d.

Figure 7:
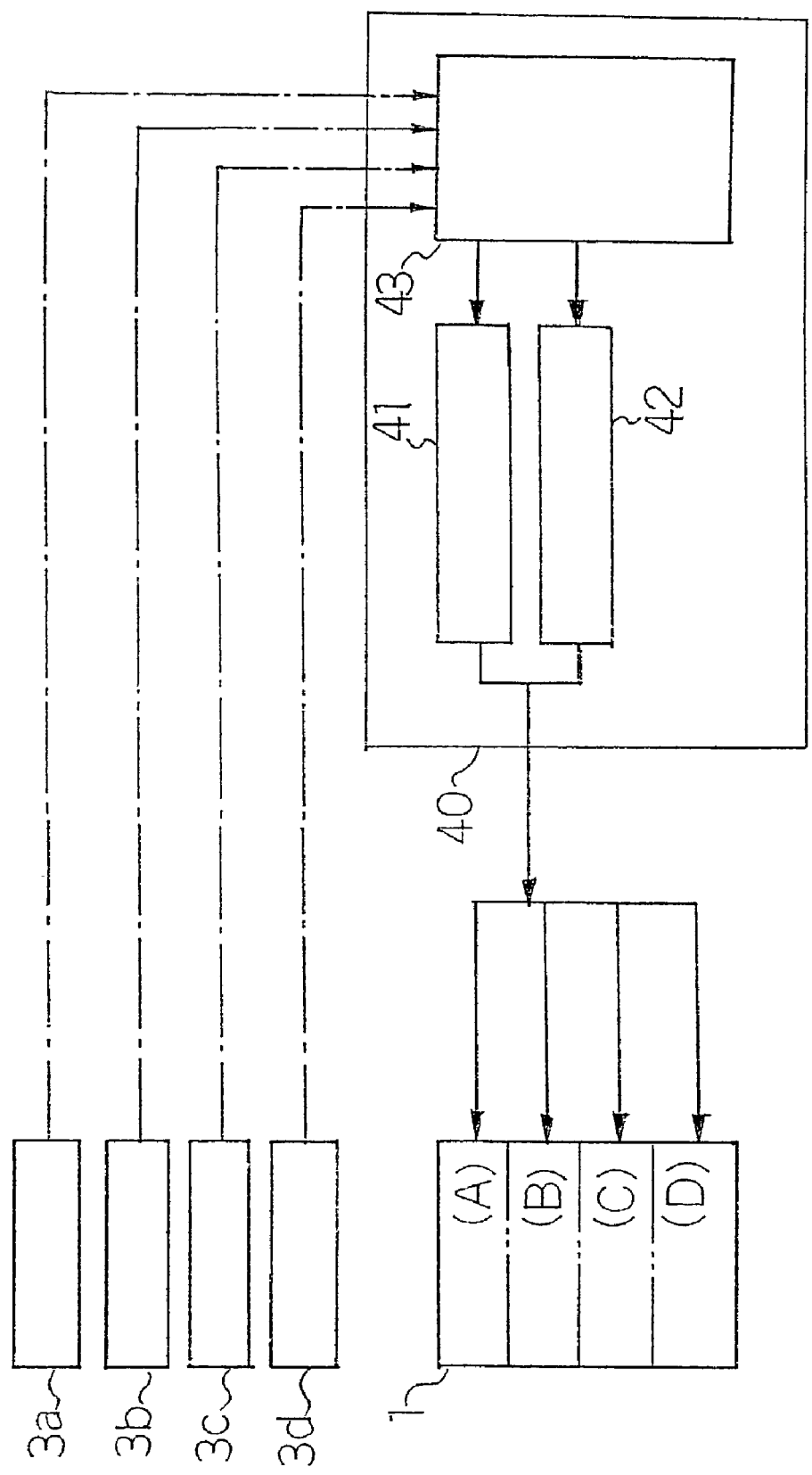
FIG. 7 is a control system diagram of the third embodiment.

FIG. 7 is a control system diagram of the third embodiment shown in FIG. 6. As shown there, signals of the vibration of the rotary shaft 50 detected by the four vibration sensors 3a–3d surrounding the rotary shaft 50 are taken by a control part 43 of a control unit 40. The control part 43 compares the detected values of the gaps between the rotary shaft 50 and the vibration sensors 3a–3d with a reference value of the gap that is set as a value when no vibration occurs and identifies the sensor of the four vibration sensors 3a–3d that detects the smallest or largest variation in the detected signals. That is, if the sensor detecting the smallest gap between the rotary shaft 50 and the vibration sensor is identified, the coil located at the same position as that sensor is fed with exciting current so as to strengthen a repulsive force relative to the rotary shaft 50 to thereby suppress displacements of the rotary shaft 50. Conversely, if the sensor detecting the largest gap is identified, the coil located at the same position as that sensor is excited so as to strengthen an attractive force of the coil and thereby the rotary shaft 50 returns to the original position to reduce the vibration.

Also, in comparing the detected signals with the reference value, the control unit 40 obtains a time-wise change rate and an inclination of the change of the signals detected by the sensors and, based on the result thereof, the vibration can be detected.

In FIG. 7, when the control part 43 determines which coil is to be excited, it then judges the size of the difference between the displaced gap and the reference gap and, according to the size of the displacement, changes the amplitude of the input current of the coil by combining outputs of a linear vibration control part 41 and a non-linear vibration control part 42 to thereby control the exciting current of any of coils (A), (B), (C) and (D) of the coil 1. For example, as will be described below with respect to FIG. 8, the input signals of the coil are first controlled linearly and when the vibration exceeds a predetermined reference value, the input signals of the coil are controlled non-linearly with a curved line.

Figure 8A:
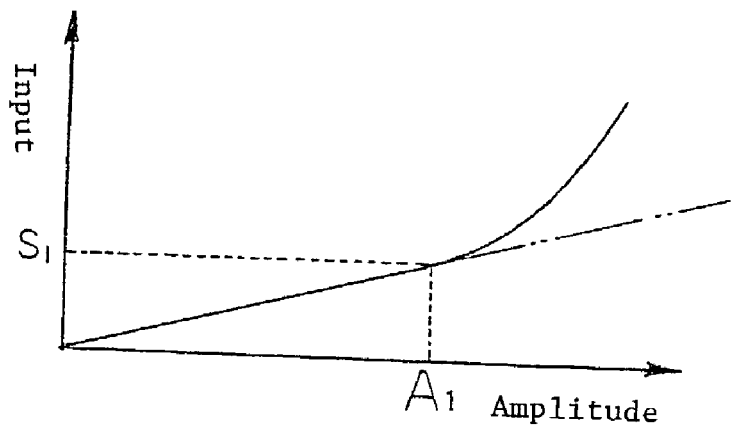
FIGS. 8(a) to (c) show three patterns of excitation of a vibration control coil of the third embodiment, wherein FIGS. 8(a) and (b) show patterns combining linear and non-linear ones
Figure 8B:
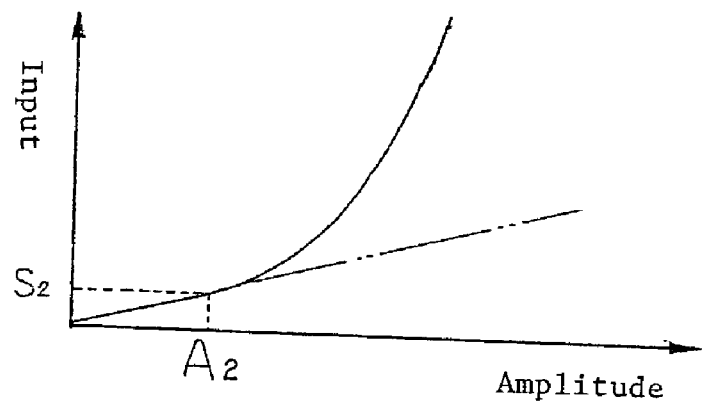
Figure 8C:
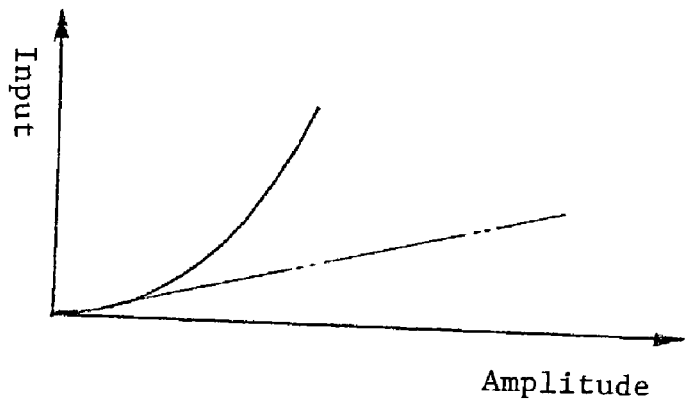

FIGS. 8(a)–(c) show three patterns of excitation current of the coil controlled by the control unit 40 for the vibration control in the third embodiment. In the pattern of FIG. 8(a), linear input signals are output from the linear vibration control part 41 up to amplitude $A_1$ of the input current to be inputted into the coil or up to input signal $S_1$ of the coil. For an amplitude greater than $A_1$ or an input signal greater than $S_1$, non-linear input signals are output from the non-linear vibration control part 42. These non-linear input signals are of non-linear wave shapes that are defined, for example, by an equation: Input Signal $S=ax+ax^2+ax^3+\ldots+ax^n$ (a and n being constants, X being amplitude). This example of FIG. 8(a) is effective for a case where the amplitude of the vibration is comparatively large, the displacement of the rotary shaft 50 relative to the sensor is larger than a predetermined value and the vibration is of a low frequency. In other words, this example is applicable to a case where the vibration is to be rapidly reduced by the non-linear part.

The example of FIG. 8(b) is a case where the amplitude of the input signal is smaller than that of the case of FIG. 8(a) ($A_1>A_2$). Input signals are output to the coil from the linear vibration control part 41 up to amplitude $A_2$. For an amplitude greater than $A_2$ or an input signal greater than $S_2$, input signals are output to the coil from the non-linear vibration control part 42. This example of FIG. 8(b) is applicable to a case where the amplitude of the vibration is smaller than in the case of FIG. 8(a).

In the example of FIG. 8(c), only the output of the non-linear vibration control part 42 is applicable. This case is effective for a case where the input signals of the coil are rapidly raised so that the vibration may be rapidly controlled. In this example, effective input signals can be obtained for the vibration of a comparatively high frequency.

In the third embodiment, the control unit 40 takes the vibrational displacement signals of the rotary shaft 50 from the vibration sensor 3, so that the control part 43 compares the size of the displacement signals from the vibration sensors with the reference value and, according to the size, changes the amplitude of the input current of the coil by combining outputs of the linear vibration control part 41 and the non-linear vibration control part 42 and then puts out input signals of the coil. Thereby, an effective vibration control can be performed. Hence, by the vibration control of the rotary shaft 50 in the microgravitational environment in space, negative influences on the surroundings can be prevented.

Also, as an alternative procedure, the control unit 40 takes signals from the vibration sensor 3 to thereby obtain a change rate of the vibration in a predetermined time and to compute the size of inclination of the changes. Based on one or more of the computed values of the quantity, the size is decided and, based on the size so decided, the exciting current can be controlled. For example, if the change rate or the inclination of the changes is large in comparison to the predetermined value, it can be decided that the vibration is large. Conversely, if the change rate or the inclination of the changes is small, it can be decided that the vibration is comparatively mild.

Figure 9:
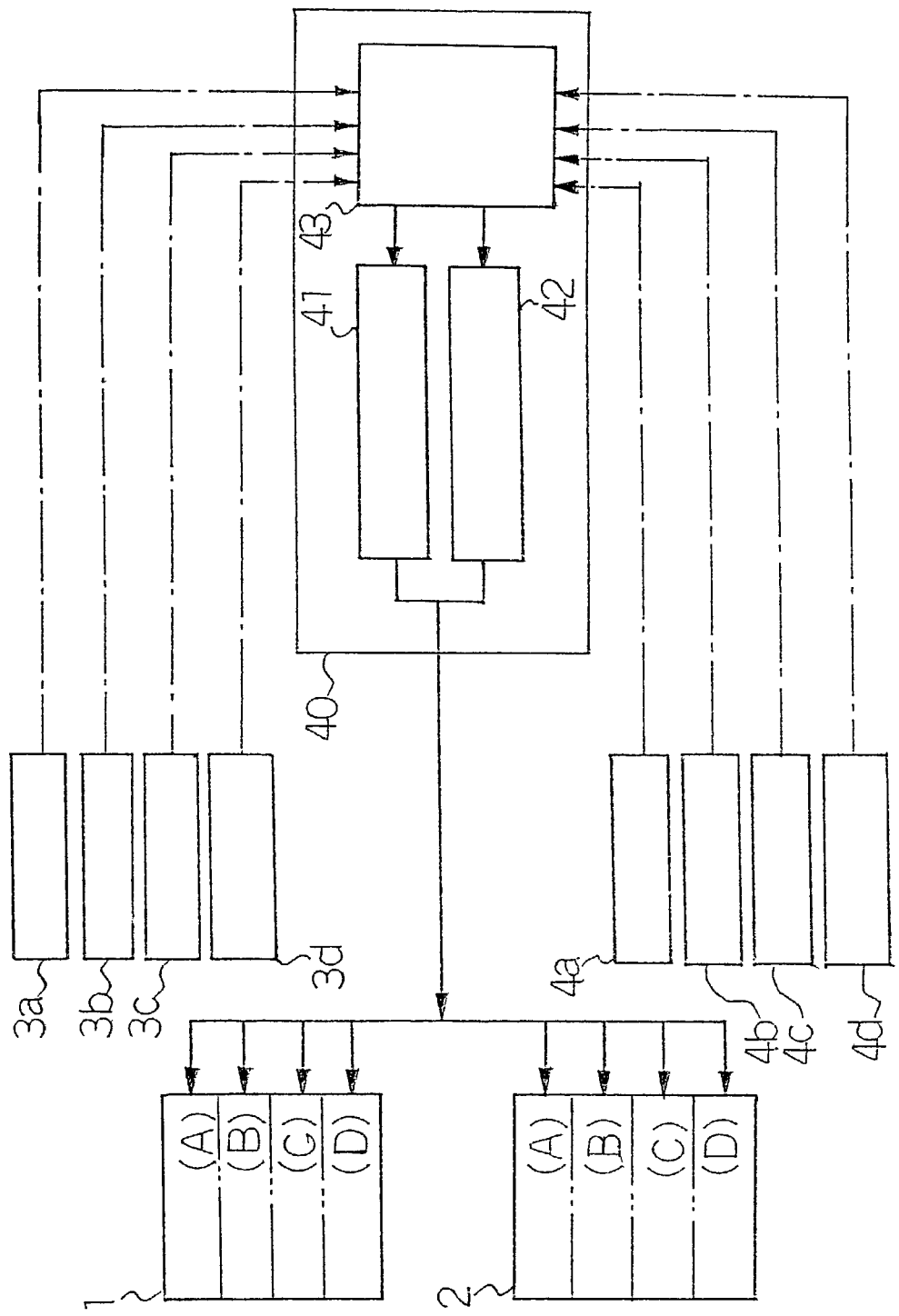
FIG. 9 is a control system diagram of a rotator supporting mechanism in a microgravitational rotating apparatus of a fourth embodiment according to the present invention.

FIG. 9 is a control system diagram of a rotator supporting mechanism in a microgravitational rotating apparatus of a fourth embodiment according to the present invention. This fourth embodiment is constructed such that the rotator supporting mechanism of the first embodiment shown in FIG. 1 is applied with the active vibration control system shown in FIG. 7.

In the fourth embodiment, like in the construction shown in FIG. 1, the bearings of the rotary shaft 30 are magnetic bearings 11, 12 and thereby the rotary shaft 30 is supported at the casing 10 side by the magnetic force. The magnetic force is generated by an electric current supplied from an electric source (not shown), so as to make no contact with a supporting portion of the casing 10. If vibrations occur in the rotary shaft 30, the vibrations are detected by the vibration sensors 3, 4, respectively, arranged on the X and Y axes around both end portions of the rotary shaft 30. Variations caused by the vibrations in the gaps between the rotary shaft 30 and the sensors are detected by the vibration sensors 3, 4 to be inputted into the control unit. If the gaps become smaller or larger, the control unit controls the electric currents of the coils 1, 2, arranged in the magnetic bearings 11, 12, existing at the corresponding positions of the gaps so that the gaps may return to their original state. Thereby, the vibrations are actively controlled.

Like in the first embodiment shown in FIG. 1, the coils 1, 2 may be constructed such that in each of the coils 1, 2, four mutually independent windings are arranged so that the magnetic force may act in the four directions of the X and Y axes. The control unit controls excitation of the coil existing at the position where the variation in the gap between the coil and the rotary shaft 30 caused by inclining of the rotary shaft 30 is the largest to thereby adjust the repulsive force or attractive force relative to the rotary shaft 30 for the vibration control.

In FIG. 9, the vibration sensors 3, 4 arranged at the upper and lower end portions of the rotary shaft 30 comprise vibration sensors 3a, 3b, 3c, 3d and 4a, 4b, 4c, 4d, respectively, and each of their detected signals is inputted into a control part 43 of a control unit 40. The control part 43 monitors the vibrational displacements of the ends of the rotary shaft 30 in the four directions of the X and Y axes of the vibration sensors 3, 4. If the gaps between the sensors and the rotary shaft 30 become smaller or larger, the control part 43 controls the exciting current of the windings of the coils 1, 2 existing at the corresponding position on the X and Y axes so as to strengthen the repulsive force or attractive force between the rotary shaft 30 and the coils to thereby return the gaps to their original state. It is to be noted that the exciting current of the coils 1, 2 acting as a bearing is supplied from an electric source, that is not shown, and the control unit 40 is fed with electric current for the control purpose in addition to this exciting current.

When the control part 43 controls the coils 1,2, it judges the difference between the displaced gap and the reference gap. According to the size of the displacement, the control part 43 changes the amplitude of the input current of the coils by combining outputs of the linear vibration control part 41 and the non-linear vibration control part 42 to thereby control the exciting current of any of coils (A), (B), (C) and (D) of the coils 1, 2, as described with respect to FIGS. 7 and 8. The patterns of the exciting current are the same as those shown in FIG. 8 and a description thereof is omitted.

In the fourth embodiment, like in the third embodiment, the control part 43 compares the size of the displacement signals taken from the vibration sensors to the reference value and, according to the size, changes the amplitude of the input current by combining outputs of the linear vibration control part 41 and the non-linear vibration control part 42 and then puts out input signals of the coils 1, 2. Thereby, the exciting current of the coils 1, 2 is controlled so as to perform an effective vibration control of the rotating experimental apparatus. Thus, the vibration of the rotary shaft 30 is reduced in the microgravitational environment in space and negative influences on the surroundings can be prevented.

In performing the vibration control by the magnetic bearings in the microgravitational rotating apparatus, as mentioned above, the magnetic bearings perform both a bias control for supporting the rotary shaft and the active vibration control at the same time. In this case, if a very small vibration is to be actively controlled, the magnetic bearing is necessarily supplied with a very small electric current. This may often result in the impossibility of the active vibration control itself or, according to the control of the exciting current for the active vibration control, loss of the bias control ability might occur.

In the bias control by the magnetic bearings, the rotary shaft is arranged concentrically with the bearings and a comparatively strong power is supplied for adjusting the magnetic force and for ensuring balances of the rotary shaft. For this reason, a supporting force to be elastically generated by the magnetic force becomes a stiff supporting force and even if the vibration occurring in the rotary shaft is very small, it easily spreads to the casing side via the magnetic bearings. Hence, improvement on this point is desired. Thus, a fifth embodiment according to the present invention for realizing the improvement in this area will be described next.

Figure 10:
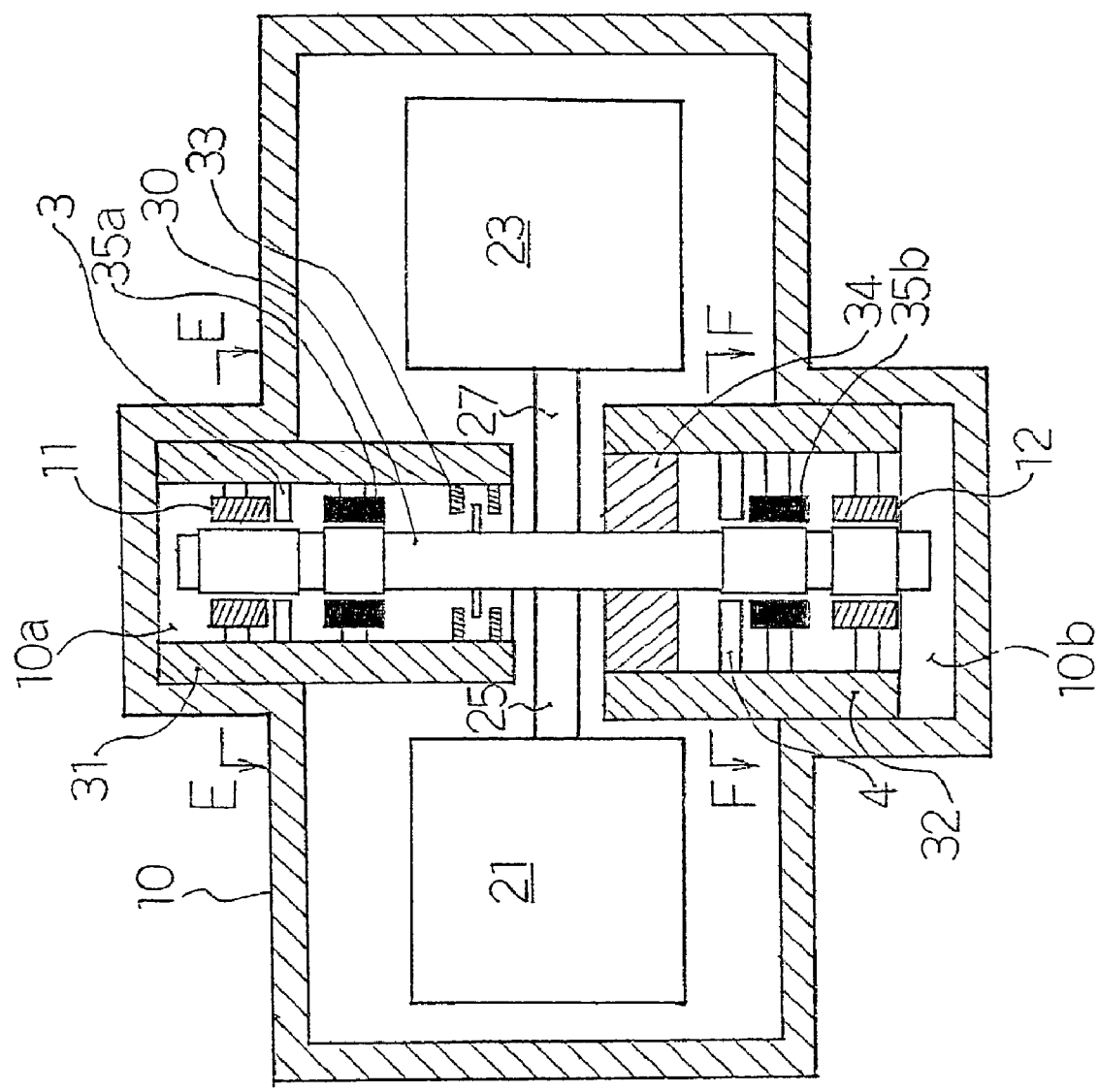
FIG. 10 is a cross sectional side view of a rotator supporting mechanism in a microgravitational rotating apparatus of a fifth embodiment according to the present invention.

FIG. 10 is a cross sectional side view of a rotator supporting mechanism in a microgravitational rotating apparatus of a fifth embodiment according to the present invention. In FIG. 10, like in the first embodiment shown in FIG. 1, recess portions 10a, 10b are provided within a casing 10. A cylindrical upper fixing member 31 and a cylindrical lower fixing member 32 are rigidly fitted in the recess portions 10a, 10b, respectively.

Like in the example of FIG. 1, a magnetic bearing 11 and a vibration sensor 3 are arranged in the upper fixing member 31. Further, a bias control magnetic bearing 35a and a thrust magnetic bearing 33 are arranged in the upper fixing member 31. In the lower fixing member 32, a vibration sensor 4, a bias control magnetic bearing 35b and a magnetic bearing 12 are arranged. Thus, an upper end portion of a rotary shaft 30 is supported by the magnetic bearings 11, 35a, 33 and a lower end portion is supported by the magnetic bearings 12, 35b. Neither of the end portions make contact with the casing 10 side due to the action of the magnetic force. The rotary shaft 30 is rotatably driven by a motor 34 fixed to the lower fixing member 32.

Like in FIG. 1, four arms 24, 25, 26, 27 each have one end fixed to an outer circumferential surface of the rotary shaft 30 extending radially and have the other end fitted with experimental boxes 20, 21, 22, 23. Gravity-adding objects are placed in each of the experimental boxes 20–23 and are rotated by the motor in the microgravitational environment.

It is to be noted that while the above example has been described to have four arms 24–27 supporting the four experimental boxes 20–23, the number of arms and experimental boxes is not limited to four. For example, eight arms may be used to support eight experimental boxes, and the number of pieces thereof may be set appropriately according to the kind, size, etc. of the experimental objects.

Figure 11A:
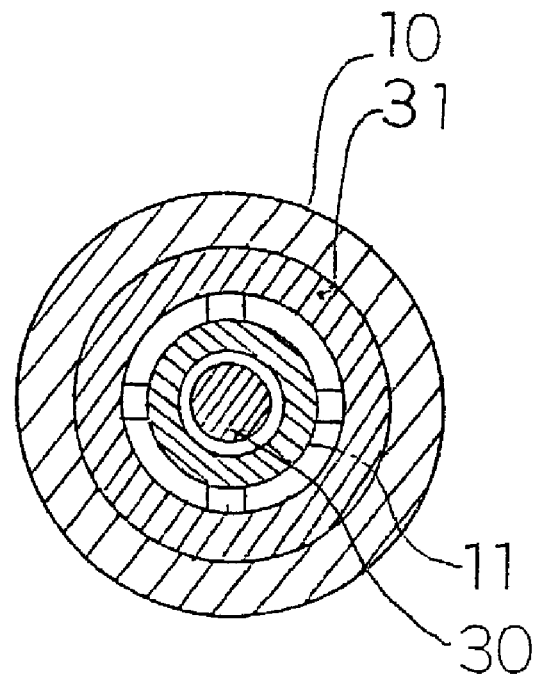
Figure 11B:
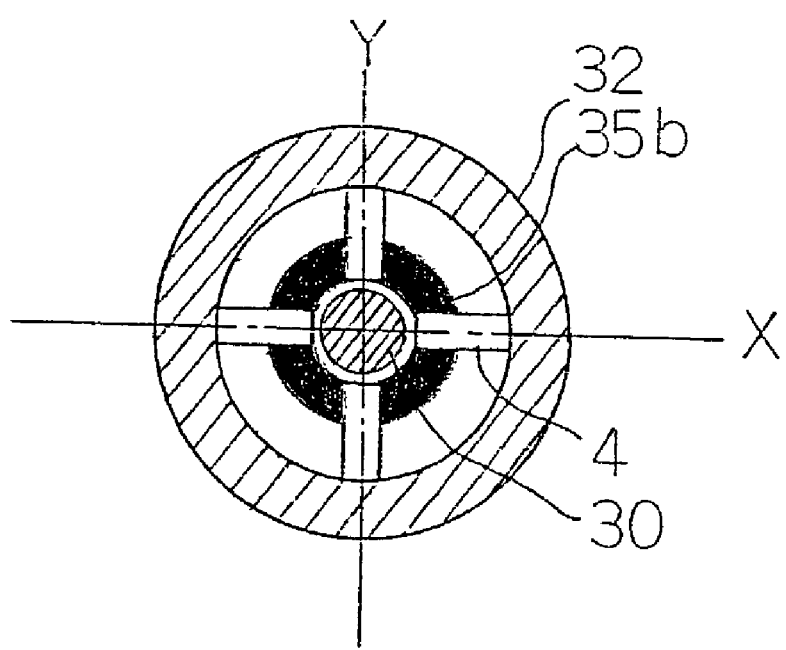
FIG. 11(b) is a cross sectional view seen from arrows on line F—F of FIG. 10.

FIGS. 11 (a) and (b) show cross sectional portions of the rotator supporting mechanism of the fifth embodiment shown in FIG. 10, wherein FIG. 11(a) is a cross sectional view seen from arrows on line E—E of FIG. 10 and FIG. 11(b) is a cross sectional view seen from arrows on line F—F of FIG. 10. In FIG. 11(a), the upper fixing member 31 of a cylindrical shape is fitted to the casing 10 and an annular coil of the magnetic bearing 11 is arranged in the upper fixing member 31. The rotary shaft 30 passes through a central portion of the mechanism. In FIG. 11(b), four vibration sensors 4 are arranged on the orthogonal X and Y coordinates in the lower fixing member 32 and, below the vibration sensors 4, the bias control magnetic bearing 35b is fitted to the lower fixing member 32. It is to be noted that vibration sensors 3 and the bias control magnetic bearing 35a are likewise arranged in the upper fixing member 31.

In the fifth embodiment as described above, when the rotary shaft 30 is rotated, imbalances occur in the acceleration between each of the experimental boxes 20–23 due to weight imbalances in the experimental objects. Thus, the rotary shaft 30 vibrates and the vibration or displacement of the rotary shaft 30 is detected by the plurality of vibration sensors 3, 4 arranged on the X and Y axes in both end portions of the rotary shaft 30, as described in the example of FIGS. 1 and 2. Signals of the vibration or displacement of the rotary shaft 30 detected by the vibration sensors 3, 4 are inputted into a control unit, as will be described below. The control unit performs a control such that, if the gap between the rotary shaft 30 and the sensor varies, then the electric current of the coil existing at the corresponding position of the varied gap is controlled so as to return the varied gap to the original state to thereby actively control the vibration.

On the other hand, when no vibration occurs, the rotary shaft 30 needs to be supported such that it makes no contact with the bearing portion. It is therefore arranged such that the coils of the bias control magnetic bearings 35a, 35b are supplied with exciting current to thereby continuously hold the rotary shaft 30 at the central position of the mechanism. In the example shown in FIG. 1, it is the magnetic bearings 11, 12 effecting the active vibration control that holds the rotary shaft 30 centrally, and thereby the bias control and the active vibration control of the rotary shaft 30 are performed at the same time. For this reason, however, the rotary shaft 30 is supported strongly by the magnetic force generated by the electric current for the bias control and, even if the vibration is very small, it easily spreads to the casing 10 side via the magnetic bearings. Achievement of an effective vibration control of such a very small vibration by the magnetic bearings has been difficult.

Thus, in the fifth embodiment, as a first means for the bias control magnetic bearings 35a, 35b to hold the rotary shaft 30 at the central position, the magnetic bearings 35a, 35b are supplied with a constant exciting current for holding the position of the rotary shaft 30. Then, if vibrations occur in the rotary shaft 30, only the active vibration control magnetic bearings 11, 12 are controlled such that the magnetic force of the coils of the magnetic bearings 11, 12 existing at the position corresponding to the vibration of the bias control magnetic bearings 35a, 35b may be weakened to thereby weaken the position holding force for increase of the freedom. Thus, the vibrations are prevented from spreading to the casing 10 side via the magnetic bearings 35a, 35b. At the same time, while the position holding force of the magnetic bearings 11, 12 is weakened, the exciting current of the magnetic bearings 11, 12 is controlled so as to control the vibration, as described above with respect to FIGS. 1 and 2.

Next, as a second means, while the bias control magnetic bearings 35a, 35b are supplied with electric current for holding the position of the rotary shaft 30, if vibration occurs in the rotary shaft 30, the magnetic bearings 35a, 35b are first controlled so that the position holding force of the magnetic bearings 35a, 35b may be weakened to thereby increase the freedom. At the same time, the active vibration control magnetic bearings 11, 12 are controlled to similarly control the vibration.

According to the first means of the fifth embodiment, the bias control magnetic bearings 35a, 35b are not controlled for the vibration control but perform only the function of holding the position of the rotary shaft 30. The active vibration control magnetic bearings 11, 12 perform both the functions of the vibration control and the weakening of the position holding force. Thereby, even the very small vibrations can be effectively controlled so as to be prevented from spreading outside of the casing 10. Also, according to the second means, the bias control magnetic bearings 35a, 35b are controlled so as to weaken the position holding force. At the same time, the active vibration control magnetic bearings 11, 12 are controlled so as to perform the vibration control. By this means also, the vibrations are prevented from spreading outside of the casing 10 and even the very small vibrations can be effectively controlled.

Figure 12B:
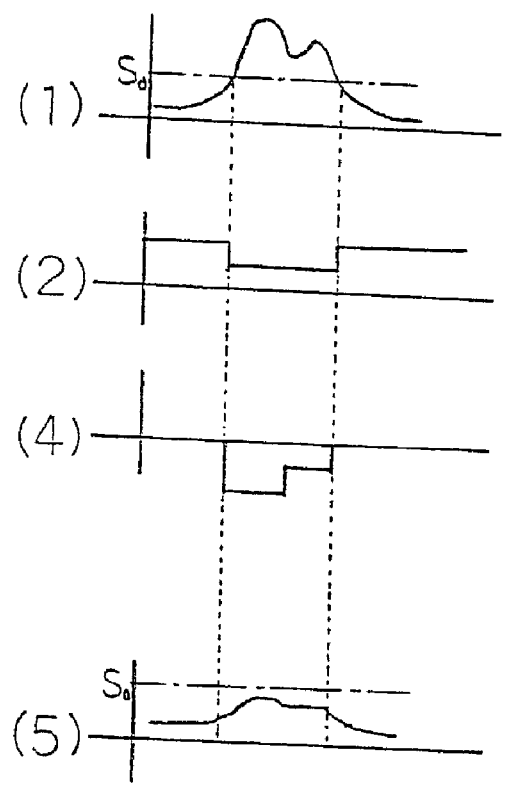
Figure 12A:
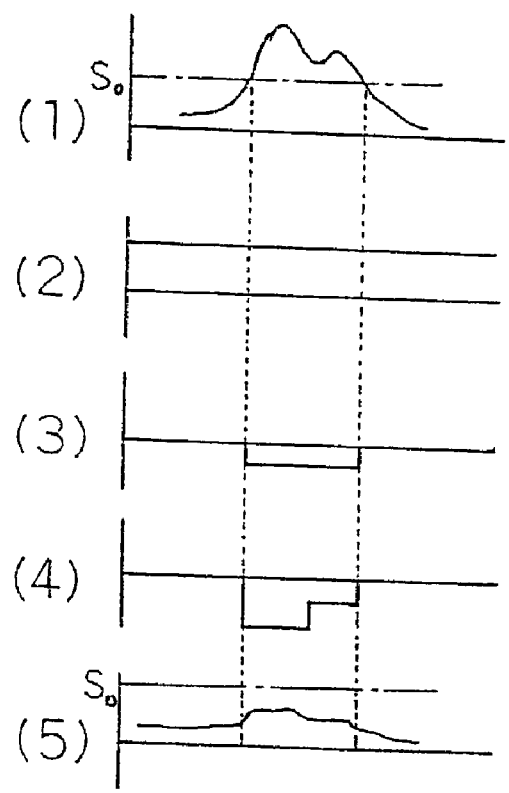

FIGS. 12(a) and (b) are signal timing charts showing a control state with respect to the fifth embodiment. FIG. 12(a) shows the example of the above-mentioned first means in which the bias control magnetic bearings 35a, 35b are not controlled. FIG. 12(b) shows the example of the second means in which the bias control magnetic bearings 35a, 35b are controlled. FIGS. 12(a) and (b) show the charts with respect to only one coil out of the coils of the active vibration control magnetic bearings 11, 12 and the bias control magnetic bearings 35a, 35b, respectively. In FIG. 12(a), (1) shows a wave shape of the vibration caused in the rotary shaft 30, wherein So shows a reference value. (2) shows electric current supplied to the bias control magnetic bearings 35a, 35b for the position holding. (3) shows electric current supplied to the active vibration control magnetic bearings 11, 12 for weakening the position holding force, wherein this electric current is put out while the vibration is in excess of the reference value So. (4) shows e electric current supplied to the magnetic bearings 11, 12 for the active vibration control while the vibration is in excess of the reference value So, and (5) shows the result of the vibration control. That is, in the example of FIG. 12(a), while the bias control magnetic bearings 35a, 35b are continuously supplied with the current (2) for the position holding, the active vibration control magnetic bearings 11, 12 are supplied with the current (3) for weakening the position holding force and supplied with the current (4) for the active vibration control. Thus, as shown in (5), if the vibration (1) exceeds the reference value So, the magnetic bearings 11, 12 weaken the position holding force and, at the same time, perform the active vibration control so that the vibration (1) may be suppressed below the reference value So.

On the other hand, in the example of FIG. 12(*b*) in which (1), (2), (4) and (5) have the same meanings as described with respect to FIG. 12(*a*), respectively, if and while the vibration (1) exceeds the reference value So, the current (2) supplied to the bias control magnetic bearings 35*a*, 35*b* for the position holding is controlled to be reduced so that the position holding force of this portion of the vibration exceeding the reference value So may be weakened. In this state, the magnetic bearings 11, 12 are supplied with the current (4) for the active vibration control. Thus, as shown in (5), the vibration (1) in excess of the reference value So can be suppressed.

Figure 13:
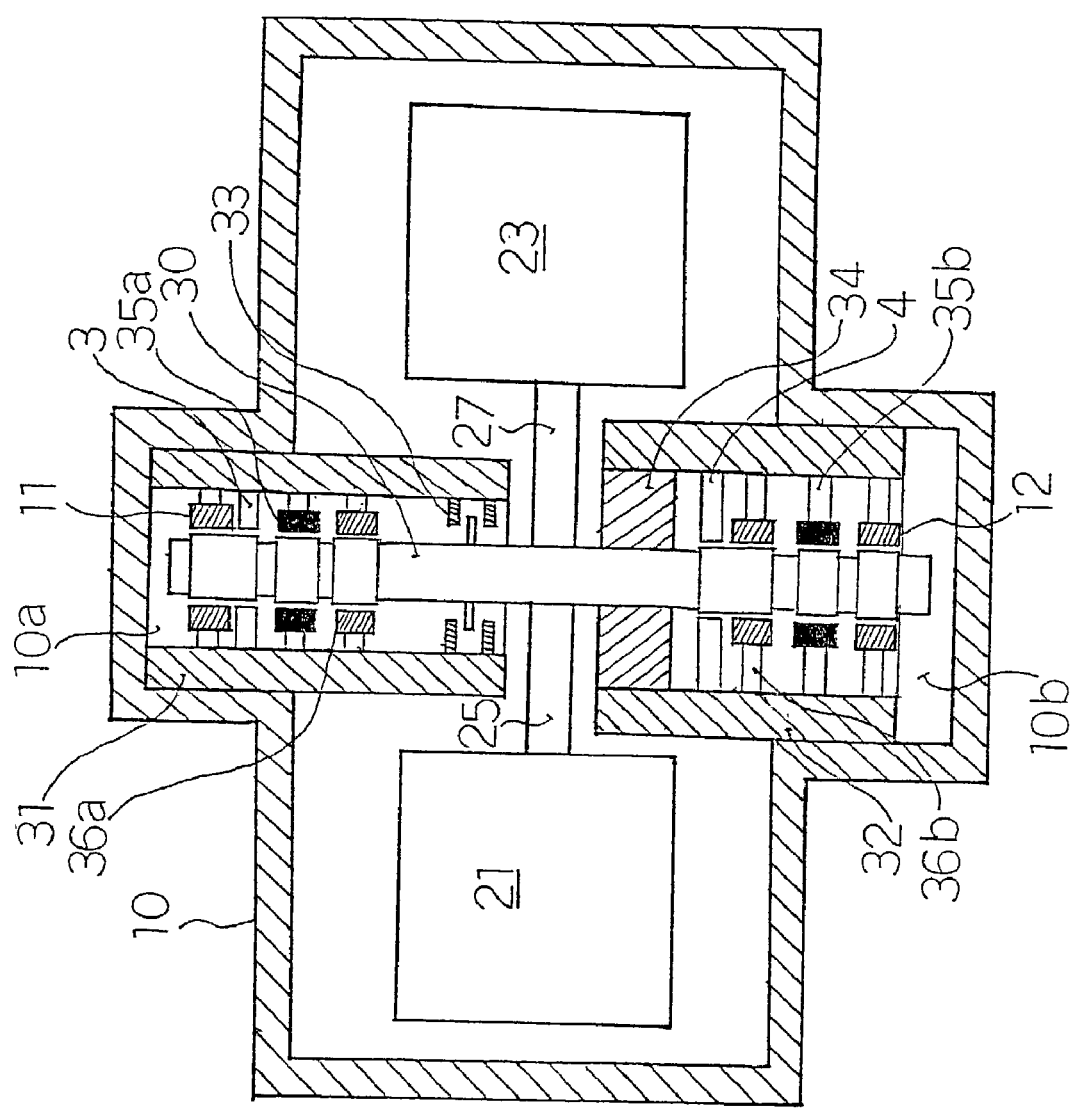
FIG. 13 is a cross sectional side view of a rotator supporting mechanism in a microgravitational rotating apparatus of a sixth embodiment according to the present invention.

FIG. 13 is a cross sectional side view of a rotator supporting mechanism in a microgravitational rotating apparatus of a sixth embodiment according to the present invention. In the sixth embodiment shown here, in addition to the shaft supporting structure of the rotary shaft 30 of the fifth embodiment shown in FIG. 10, active vibration control magnetic bearings 36*a*, 36*b* are added for performing a more effective vibration control. Construction of other portions is the same as that of the fifth embodiment and a description thereof is omitted.

In FIG. 13, within the upper fixing member 31, the active vibration control magnetic bearings 11, 36*a* are arranged with the bias control magnetic bearing 35*a* interposed therebetween. Also, within the lower fixing member 32, the active vibration control magnetic bearings 12, 36*b* are arranged with the bias control magnetic bearing 35*b* interposed therebetween. The magnetic bearings 35*a*, 35*b* function to hold the position of the rotary shaft 30. The magnetic bearings 11, 36*a* function to actively control the vibration of the upper end of the rotary shaft 30, and the magnetic bearings 12, 36*b* function to actively control the vibration of the lower end of the rotary shaft 30. As to the concrete functions of the vibration control, the same contents described with respect to FIG. 2 are applicable as they are and a description thereof is omitted.

According to the sixth embodiment as described above, two pairs of the active vibration control magnetic bearings 11, 36*a* and 12, 36*b*, each bearing having the same function, are arranged with the bias control magnetic bearings 35*a*, 35*b* interposed between the bearings of the pair, respectively. Thereby, the vibration control of the rotary shaft 30 is balanced and a higher accuracy of the vibration control can be realized, as compared with the fifth embodiment.

Figure 14:
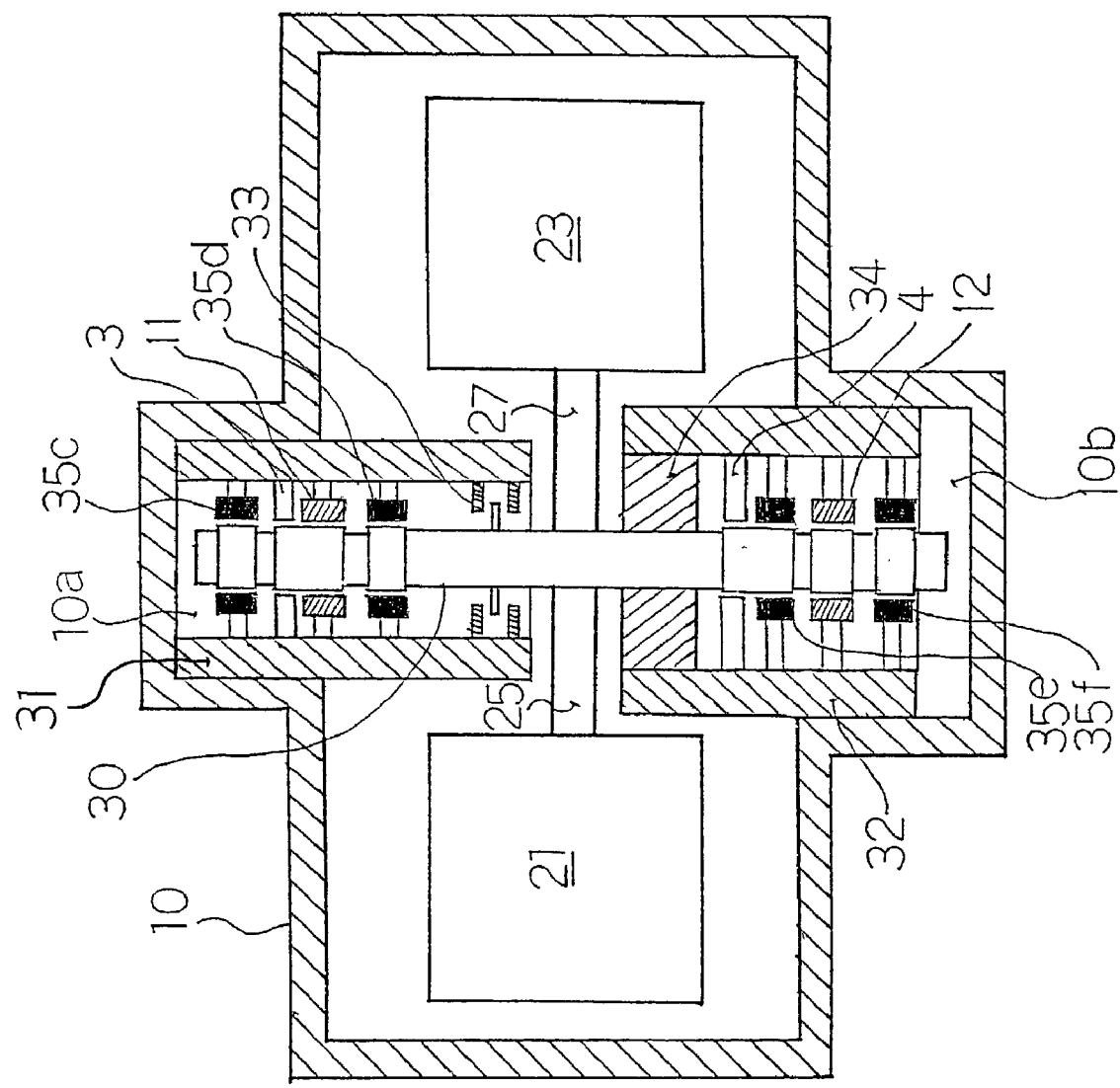
FIG. 14 is a cross sectional side view of a rotator supporting mechanism in a microgravitational rotating apparatus of a seventh embodiment according to the present invention.

FIG. 14 is a cross sectional side view of a rotator supporting mechanism in a microgravitational rotating apparatus of a seventh embodiment according to the present invention. In the seventh embodiment shown here, in addition to the shaft supporting structure of the rotary shaft 30 of the fifth embodiment shown in FIG. 10, bias control magnetic bearings are added for a more effective position holding of the rotary shaft 30. Construction of other portions is the same as that of the fifth embodiment and a description thereof is omitted.

In FIG. 14, within the upper fixing member 31, bias control magnetic bearings 35*c*, 35*d* are arranged with the active vibration control magnetic bearing 11 interposed therebetween. Also, within the lower fixing member 32, bias control magnetic bearings 35*e*, 35*f* are arranged with the active vibration control magnetic bearing 12 interposed therebetween. The magnetic bearings 35*c–f* function to hold the position of the rotary shaft 30 at both ends thereof. The magnetic bearing 11 functions to actively control the vibration of the upper end of the rotary shaft 30 and the magnetic bearing 12 functions to actively control the vibration of the lower end of the rotary shaft 30. As to the concrete functions of the vibration control, the same contents described with respect to FIG. 7 are applicable as they are and a description thereof is omitted.

According to the seventh embodiment as described above, two pairs of the bias control magnetic bearings 35*c*, 35*d* and 35*e*, 35*f*, each bearing having the same function, are arranged with the active vibration control magnetic bearings 11, 12 interposed between the bearings of the pair, respectively. Thereby, the control of the vibration and the position holding of the rotary shaft 30 is balanced and a higher accuracy of the vibration control can be realized, as compared with the fifth embodiment.

In the microgravitational rotating apparatus having the rotator supporting mechanisms of the first to the fifth embodiments as described above, while vibrations occur in the rotary shaft during the rotation due to the weight imbalances between the experimental objects placed in the experimental boxes, such vibrations can be effectively controlled by the present invention. However, as the rotator is supported by the magnetic bearings, it is necessary to hold the rotary shaft such that it makes no contact with the surroundings even in the non-operational state. Thus, according to the initial state of the rotary shaft, when the magnetic bearings are supplied with power for starting the rotator, shocks during the starting time may occur which may cause the rotary shaft to violently collide with the surroundings and strong vibratioins may spread outside. Hence, as a countermeasure therefor, a rotator supporting mechanism of an eighth embodiment according to the present invention will be described below.

Figure 15:
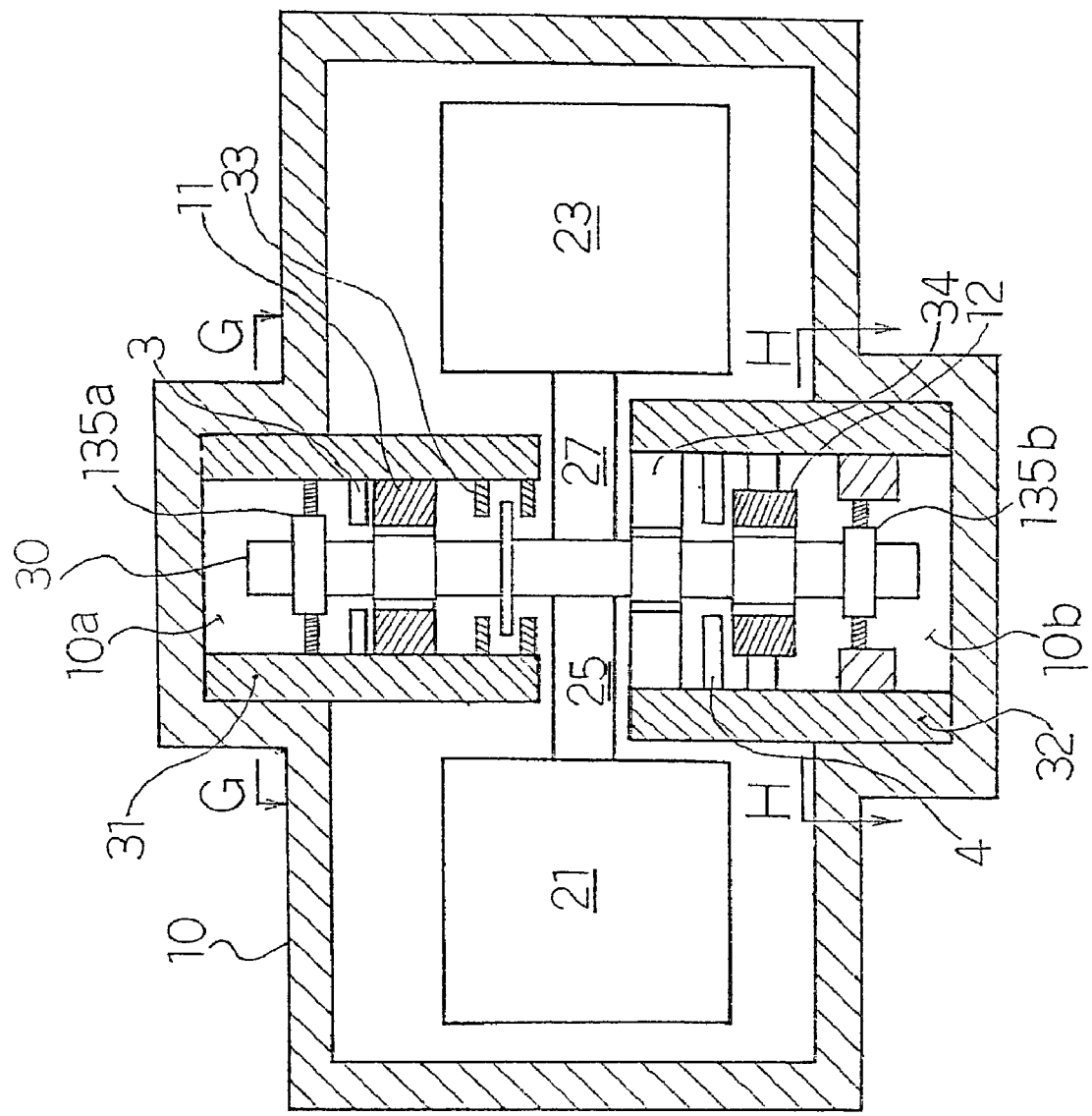
FIG. 15 is a cross sectional side view of a rotator supporting mechanism in a microgravitational rotating apparatus of an eighth embodiment according to the present invention.

FIG. 15 is a cross sectional side view of a rotator supporting mechanism of the eighth embodiment. In FIG. 15, within a casing 10, recess portions 10*a*, 10*b* project outwardly from upper and lower outer walls of the casing 10. A cylindrical upper fixing member 31 and a cylindrical lower fixing member 32 fixed in the recess portions 10*a*, 10*b*, respectively.

A vibration sensor 3, a magnetic bearing 11 and a thrust magnetic bearing 33 are arranged within the upper fixing member 31. A motor 34, a magnetic bearing 12 and a vibration sensor 4 are arranged within the lower fixing member 32. Also, as will be further described later, elastic support mechanisms 135*a*, 135*b* are provided in the upper and lower fixing members 31, 32, respectively, for an elastic support of a rotary shaft 30. The vibration sensors 3, 4 are provided in the same arrangement as the example shown in FIG. 1(*c*).

The rotary shaft 30 is arranged coaxially with the cylindrical upper and lower fixing members 31, 32. An upper end of the rotary shaft 30 is supported to the upper fixing member 31 by the magnetic bearing 11 and the thrust magnetic bearing 33 and is also elastically supported by the elastic support mechanism 135*a*. Also, a lower end of the rotary shaft 30 is supported to the lower fixing member 32 by the magnetic bearing 12 and is also elastically supported by the elastic support mechanism 135*b*.

The rotary shaft 30, while being supported as mentioned above, is driven rotationally by the motor 34 fitted to the lower fixing member 32. Like in the example of FIG. 1, four arms 24–27 each have one end fixed to an outer circumferential surface of the rotary shaft 30 extending radially and have the other end fitted with experimental boxes 20–23.

Figure 16:
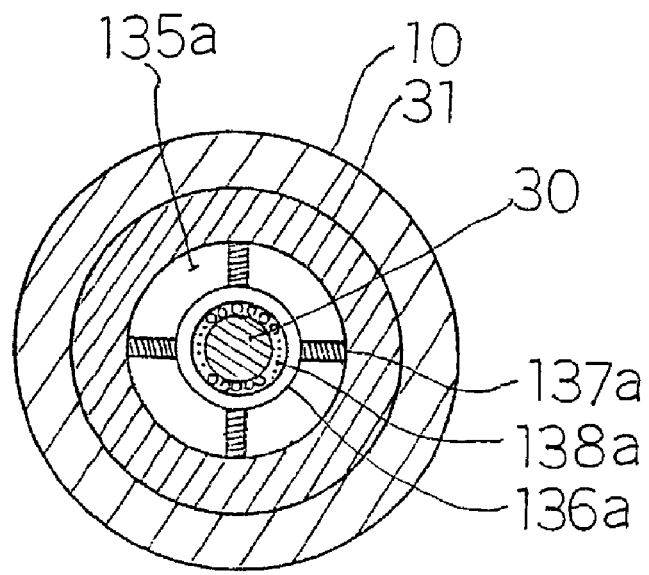
FIG. 16 is a cross sectional view seen from arrows on line G—G of FIG. 15.

FIG. 16 is a cross sectional view seen from arrows on line G—G of FIG. 15 for explaining the elastic support mechanism 135a. In FIG. 16, the cylindrical upper fixing member 31 is fitted to the casing 10 and the rotary shaft 30 is arranged centrally therein by being supported to the upper fixing member 31 via the elastic support mechanism 135a. The elastic support mechanism 135a comprises a bearing 138a on an inner side thereof, a ring-like supporting main body 136a on an outer side thereof and four springs 137a arranged around the supporting main body 136a connecting an outer circumferential surface of the supporting main body 136a and an inner circumferential surface of the upper fixing member 31. Thus, the rotary shaft 30 is supported rotatably by the elastic support mechanism 135a and, at the same time, supported elastically and movably relative to the surroundings by the springs 137a.

It is to be noted that a spring constant of the springs 137a of the elastic support mechanism 135a is selected to be a minimum value to be able to support the rotary shaft 30 at central positions of the magnetic bearings 11, 12, 33 while in a non-operational state. Also, it is necessary to employ such springs as having a weak supporting force that is smaller than the rotary shaft 30 supporting force of the magnetic bearings 11, 12 so that, when vibrations occur in the rotary shaft 30, the vibrations may not spread to the casing 10 side via the springs 137a.

Figure 17:
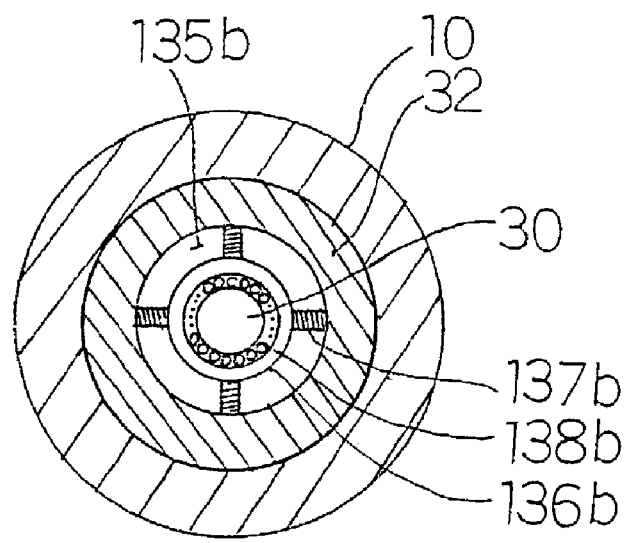
FIG. 17 is a cross sectional view seen from arrows on line H—H of FIG. 15.

FIG. 17 is a cross sectional view seen from arrows on line H—H of FIG. 15 for explaining the elastic support mechanism 135b. In FIG. 17, the cylindrical lower fixing member 32 is fitted to the casing 10 and the rotary shaft 30 is arranged concentrically therein by being supported to the lower fixing member 32 via the elastic support mechanism 135b. The elastic support mechanism 135b comprises a bearing 138b on an inner side thereof, a ring-like supporting main body 136b on an outer side thereof and four springs 137b arranged around the supporting main body 136b connecting an outer circumferential surface of the supporting main body 136b and an inner circumferential surface of the lower fixing member 32. Thus, the rotary shaft 30 is supported rotatably by the elastic support mechanism 135b and, at the same time, supported elastically and movably relative to the surroundings by the springs 137b.

It is to be noted that, like in the case of the above-mentioned springs 137a, a spring constant and a supporting force of the springs 137b are set so as to be smaller than those of the magnetic bearings 11, 12.

According to the eighth embodiment as described above, if vibrations occur in the rotary shaft 30 while rotating, due to weight imbalances in the experimental objects, the vibration of the rotary shaft 30 is detected by the vibration sensors 3, 4 and signals thereof are inputted into the control unit 14, as shown in FIG. 2. By the same function as that of the device shown in FIGS. 1 and 2, the vibrations are effectively controlled by the magnetic bearings 11, 12.

Also, in the non-operational state, both ends of the rotary shaft 30 are supported at the central position of the bearing portion by the weak supporting force of the elastic support mechanisms 135a, 135b.

Hence, even if the magnetic bearings 11, 12, 33 are supplied with electric current for start thereof, control of the magnetic bearings can be smoothly carried out and the effects on the rotary shaft 30 of the shocks caused during the starting time can be reduced to a minimum.

Figure 18A:
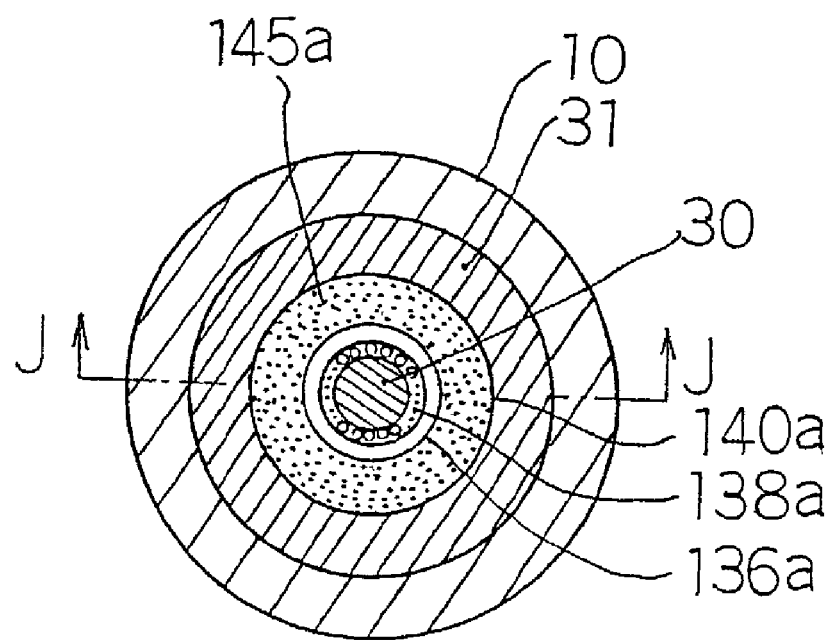
Figure 18B:
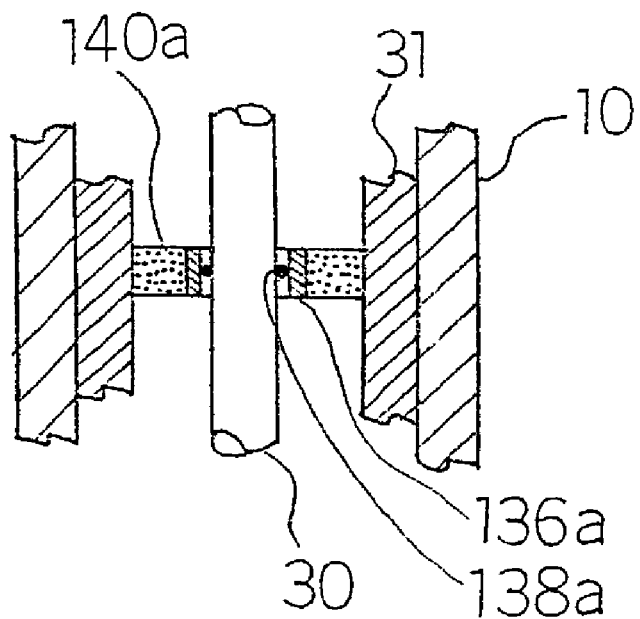
FIG. 18(b) is a cross sectional view taken on line J—J of FIG. 18(a).
Figure 19:
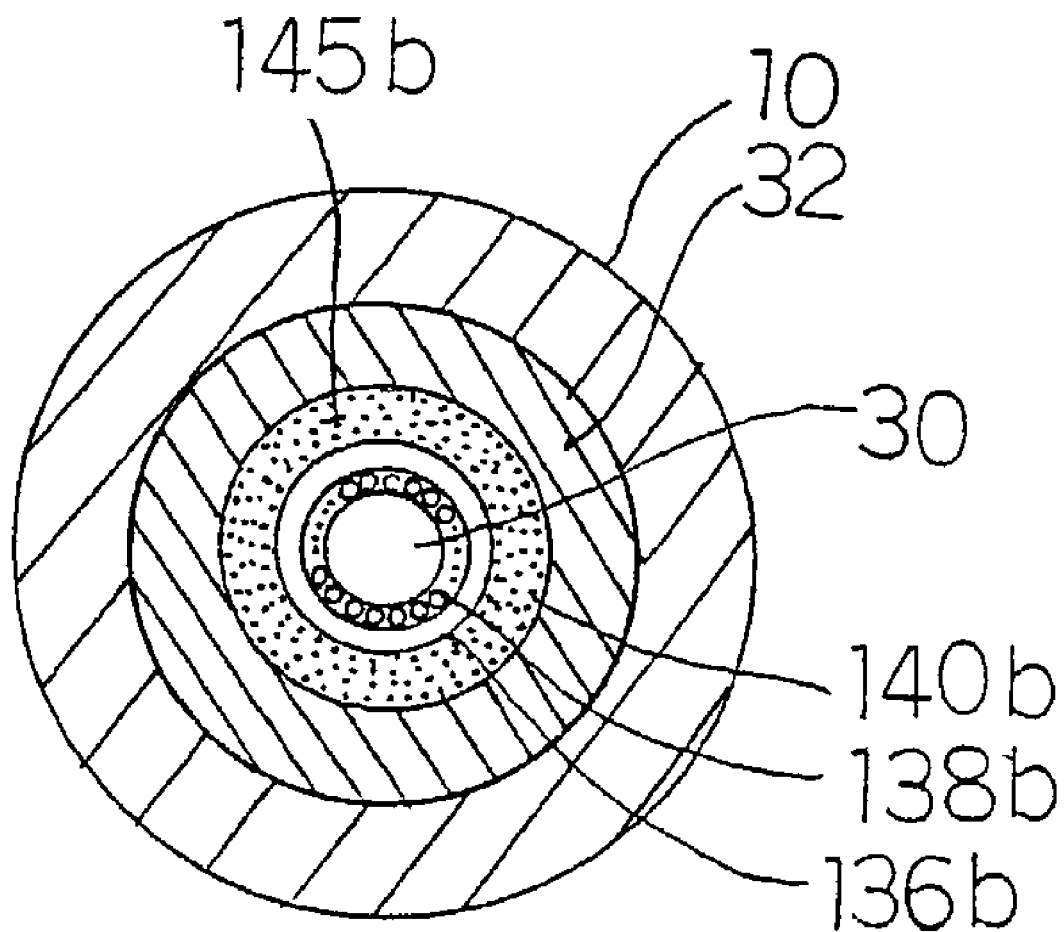
FIG. 19 is a cross sectional view of the ninth embodiment taken on a line substantially the same as the line H—H of FIG. 15.
Figure 20:
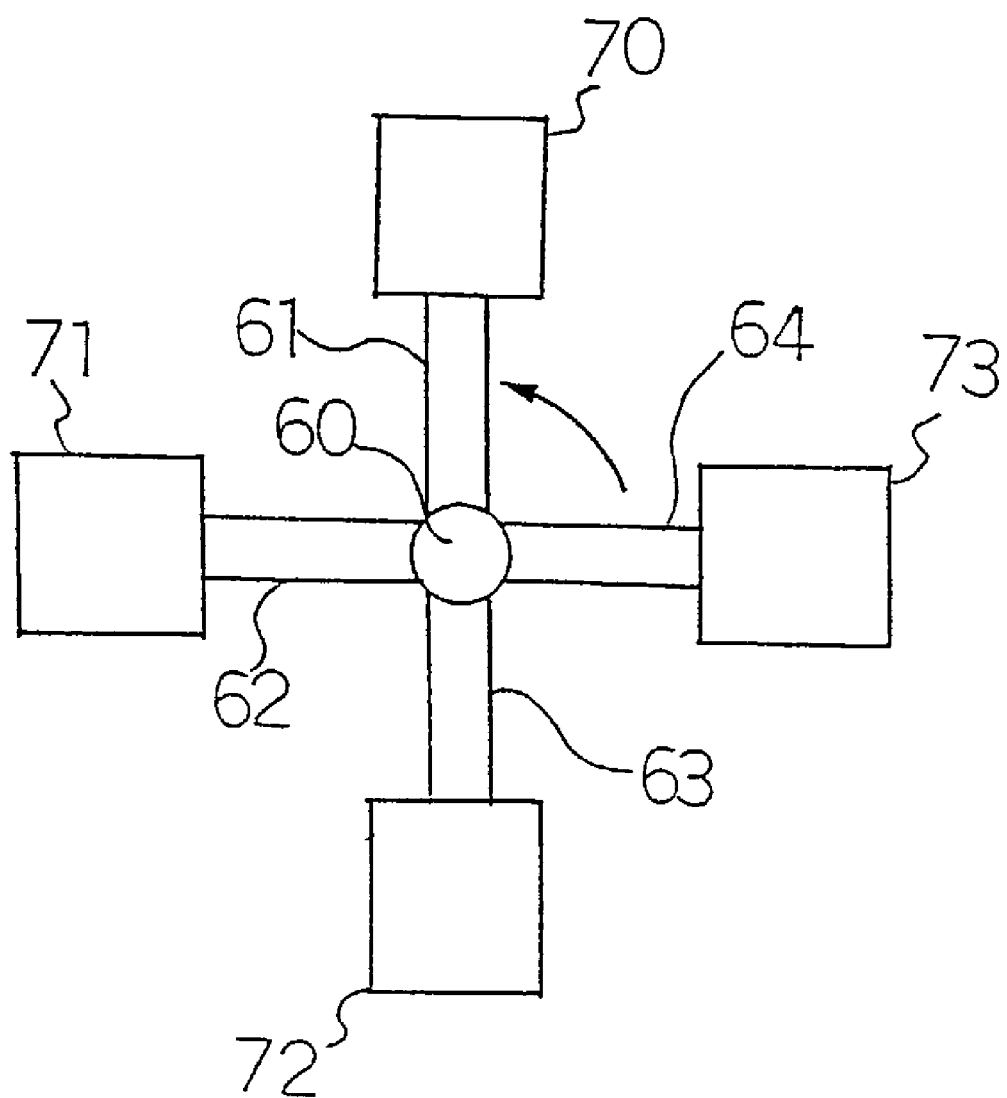
FIG. 20 is a schematic plan view showing a prior art example of a rotating apparatus currently used for experiments in the space.

FIGS. 18(a) and (b) show a rotator supporting mechanism in a microgravitational rotating apparatus of a ninth embodiment according to the present invention, wherein FIG. 18(a) is a cross sectional view taken on a line substantially the same as the line G—G of FIG. 15 and FIG. 18(b) is a cross sectional view taken on line J—J of FIG. 18(a). Also, FIG. 19 is a cross sectional view of the ninth embodiment taken on a line substantially the same as the line H—H of FIG. 15. In the ninth embodiment shown in FIGS. 18(a) and (b), in place of the elastic support mechanisms 135a, 135b constructed to support the supporting main bodies 136a, 136b by the springs 137a, 137b, the support mechanisms are constructed so as to support the supporting main bodies 136a, 136b by elastic members 140a, 140b. Construction of other portions is the same as that of the eighth embodiment shown in FIGS. 15–17 and a description thereof is omitted.

In FIGS. 18(a) and (b), an elastic support mechanism 145a comprises the bearing 138a, the supporting main body 136a and a ring-like elastic member 140a. The rotary shaft 30 is supported by the supporting main body 136a having the bearing 138a. The supporting main body 136a is supported to the upper fixing member 31 via the elastic member 140a arranged around the supporting main body 136a. The elastic member 140a is made of an elastic material, such as rubber, sponge rubber or urethane, and supports the rotary shaft 30 with a small spring constant and a weak supporting force, like in the case of the springs 137a of the eighth embodiment.

In FIG. 19, an elastic support mechanism 145b, like the elastic support mechanism 145a mentioned above, comprises the bearing 138b, the supporting main body 136b and a ring-like elastic member 140b. The rotary shaft 30 is supported by the supporting main body 136b having the bearing 138b. The supporting main body 136b is supported to the lower fixing member 32 via the elastic member 140b arranged around the supporting main body 136b. The elastic member 140b is made of an elastic material, such as rubber, sponge rubber or urethane, and supports the rotary shaft 30 with a small spring constant and a weak supporting force, like in the case of the springs 137b of the eighth embodiment.

Further, the above-mentioned elastic members 140a, 140b are not limited to rubber, sponge rubber or urethane, but may also be made of a plastic material or an elastoplastic material. They may also be made by a supporting means using a fluid material, a fluid bearing, etc.

According to the ninth embodiment, the same function and effect as in the eighth embodiment can be obtained.

It is to be noted that, in the eighth and the ninth embodiments, while the example of the rotator comprising the four arms 24–27 and the four experimental boxes 20–23 has been described, the rotator supporting mechanism in the microgravitational rotating apparatus according to the present invention may be applied to a rotator having more than four experimental boxes. For example, eight experimental boxes can be fitted to eight arms that are fitted to the rotary shaft 30 extending radially and in this case, the same effect can be obtained.

Also, the vibration sensors 3, 4 described in the first to the ninth embodiments may be any type of sensors that can detect the vibration of the rotary shaft, such as a gap sensor, a displacement sensor, an optical sensor or a laser displacement gauge.

INDUSTRIAL APPLICABILITY

According to the present invention of the respective aspects (1) to (24) mentioned above, the applicability is summarized as follows:

In the invention of aspect (1) above, the objects in the boxes are plants or animals, for example, and imbalances are caused in the weight between each of the boxes. Hence, when the rotator rotates, vibrations (and resulting reaction forces) occur due to differences in the acceleration. The control unit controls the position holding force of the bearing for holding the rotary shaft to thereby suppress displacements of the rotary shaft caused by the vibrations. Thus, the vibration of the rotator, that comprises the rotary shaft, the arms and the boxes, can be controlled to be suppressed to the minimum.

In the invention of the aspect (2) above, if vibrations occur in the rotary shaft due to imbalances in the objects in the boxes or imbalances in the system, the vibrations are detected as displacements of the rotary shaft by the vibration sensors arranged closely to the circumferential periphery of the rotary shaft and signals thereof are inputted into the control unit. The control unit detects the vibration of the rotary shaft based on these displacement signals and controls the exciting current of the coil of the magnetic bearing so as to effect the vibration control of the rotary shaft. Thus, the vibrations (and resulting reaction forces) are controlled to be suppressed and to be prevented from spreading to the surrounding environment in space via the bearing of the rotary shaft. In other words, the control unit controls vibrations of the rotary shaft so as to generate no reaction force.

In the invention of aspect (3) above, the vibration sensors are fitted both to the casing side and the rotary shaft or fitted to the rotary shaft. In the invention of aspect (4) above, in addition to the vibration sensors, a gap sensor or displacement sensor is provided and in the invention of aspect (5) above, an optical sensor or laser displacement gauge is provided. Thus, the detection of the vibration of the rotary shaft can be done with a higher accuracy.

In the invention of aspect (6) above, instead of the vibration sensors of the invention of aspect (4) the construction is made so as to detect the vibration only by the gap sensor or displacement sensor. Hence, the construction of the sensors can be simplified according to the sensing purpose or the objects in the boxes.

In the invention of aspect (7) above, if the control unit detects the vibration of the rotary shaft, it compares the vibration with the previously set vibration demand value to which the vibration of a rotating device is to be suppressed and controls the exciting current of the coil so that the vibration may be suppressed below the demand value. Hence, negative influences on other equipment or apparatus in space can be avoided.

In the invention of aspect (8) above, the control unit detects the vibration based on the displacements of the rotary shaft detected by the gap sensor, the displacement sensor, the optical sensor or the laser displacement gauge, compares the vibration with the spectrum demand value that is set with respect to the vibration spectrum and effects the control so as to suppress the vibration below the demand value. In the invention of aspect (9) above, if the detected vibration acceleration or amplitude is in excess of the demand value, the control unit effects the vibration control so that the vibration may be suppressed below the demand value concentrically with respect to the vibration range in excess of the demand value. Thus, the vibration can be instantaneously suppressed.

In the invention of aspect (10) above, the control unit stores the information of the frequency, acceleration, amplitude, etc. of the detected vibration to be reflected on the control law of the subsequent vibration controls. In the invention of aspect (11) above, the detected vibration data are compared with the previously stored data so that the cause of the vibration may be determined. In the invention of aspect (12) above, the cause of the vibration is determined based on the result of the comparison and learned so as to be reflected on the control law. Hence, by the learning function, the vibration control becomes more accurate.

In the invention of aspect (13) above, in the control of the vibration control coil, the control unit puts out the signals of which amplitude is changed by combining the linear signal and the non-linear signal corresponding to the sizes of the displacement signals sent from the vibration sensors and the vibration control coil is controlled by the output signals so put out by the control unit. By this control, the vibration can be optimally suppressed and converged.

In the invention of aspect (14) above, the bearing supporting both ends of the rotary shaft is a magnetic bearing and functions both as the rotary shaft supporting bearing and the vibration control coil. Hence, the structure of the vibration control system of the rotator is simplified and the vibration can be optimally suppressed and converged at both ends of the rotary shaft.

In the inventions of aspect (15) and (16) above, the vibration control coil is divided into coil portions. Thereby, the exciting current of the coil portion corresponding to the position where the displacement due to the vibration of the rotator is the largest is effectively controlled and thus the vibration of the rotator can be more effectively controlled.

In the invention of aspect (17) above, the control unit computes the change rate and the inclination of the changes with respect to the time-wise changes in the vibration signals sent from the vibration sensors and corresponding to the sizes of the change rate and the inclination, the excitation of the vibration control coil is controlled. Hence, a higher accuracy of the vibration control can be realized.

In the invention of aspect (18) above, the bias control magnetic bearing holds the rotary shaft at the central position of the rotation by the magnetic force. The vibration control magnetic bearing is controlled such that, upon occurrence of the vibration of the rotary shaft, the vibration control magnetic bearing generates a magnetic force so as to weaken the position holding force of the bias control magnetic bearing to a predetermined extent to thereby mitigate the position holding force of the rotary shaft. At the same time, the control to effect the active vibration control of the rotary shaft is carried out. Thus, the vibration caused by the stiff supporting force given by the bias control magnetic bearing is mitigated and even a very small vibration is prevented from spreading outside. Hence, the vibration can be effectively controlled.

In the invention of aspect (19) above, the magnetic bearing supporting both ends of the rotary shaft is constructed by the two vibration control magnetic bearings and the bias control magnetic bearing arranged between them. Hence, like in the invention of aspect (18) above, the vibration occurring in the rotary shaft can be prevented from spreading outside of the casing. Moreover, the rotary shaft has both ends supported by the magnetic bearing having therein the two vibration control magnetic bearings that are arranged in a good balance and thus a more effective vibration control becomes possible.

In the invention of aspect (20) above, the magnetic bearing supporting both ends of the rotary shaft is constructed by the two bias control magnetic bearings and the vibration control magnetic bearing arranged between them. Hence, like in the invention of aspect (18) above, the vibration occurring in the rotary shaft can be prevented from spreading outside of the casing. Moreover, the rotary shaft has both ends supported by the magnetic bearing having therein the two bias control magnetic bearings that are arranged in a good balance and thus the position holding of the rotary shaft is ensured and a more effective vibration control becomes possible.

In the invention of aspect (21) above, while the vibration control magnetic bearing is effecting the vibration control of the rotary shaft, the exciting current of the bias control magnetic bearing is controlled so as to weaken the position holding force of the rotary shaft to a predetermined extent. Thereby, the position holding force given by the bias control magnetic bearing for holding the rotary shaft is weakened and the vibration of the rotary shaft is given an increased freedom relative to the bias control magnetic bearing. Thus, the vibration is prevented from spreading to the casing side via the bias control magnetic bearing and is effectively controlled by the vibration control magnetic bearing.

In the invention of aspect (22) above, the rotary shaft is supported at the central position of the rotation, even while the magnetic bearing is being supplied with no power. Also, the shaft supporting force of the elastic support mechanism is set smaller than that of the magnetic bearing. On the other hand, the shaft supporting force of the elastic support mechanism is set so as to have a minimum shaft supporting force to support the rotary shaft at the central position while the magnetic bearing is being supplied with no power and no supporting force of the magnetic bearing is being generated. Hence, the vibration occurring in the rotary shaft is prevented from spreading to the casing side via the magnetic bearing and the vibration is effectively controlled by the magnetic bearing.

In the invention of aspect (23) above, the elastic support mechanism is constructed by the main body holding the magnetic bearing and the plurality of springs connecting the main body to the casing side. Also, in the invention of aspect (24) above, the elastic support mechanism is constructed by the main body holding the magnetic bearing and the elastic member, made of an elastic material, connecting the main body to the casing side. Thus, the rotary shaft can be elastically supported by a simple elastic support mechanism. The elastic support may be comprised of not only an elastic material such as rubber, sponge rubber or urethane, but also of a supporting means using a fluid material, a fluid bearing, etc.

The invention claimed is:

1. A microgravitational rotating apparatus comprising:
   a casing;
   a rotator including:
     a rotary shaft within said casing;
     a plurality of arms, each of said arms extending in a radial direction of said rotary shaft and having a first end fitted to a circumferential periphery of said rotary shaft; and
     a plurality of boxes, each of said boxes being fitted to a second end of a respective one of said arms, each of said boxes holding a gravitational or gravity-adding object;
   a motor for rotationally driving said rotary shaft; and
   a rotator supporting mechanism comprising:
     a bearing supporting at least one end of said rotary shaft so as to maintain said rotary shaft at a position by a position-holding force provided by said bearing; and
     a control unit operable to control the position-holding force of said bearing to thereby control vibration of said rotary shaft so as to generate no reaction force.

2. The microgravitational rotating apparatus of claim 1, wherein said bearing is a magnetic bearing including a coil fitted to a side of said casing so as to be arranged adjacent to said rotary shaft, said rotator supporting mechanism further comprising:
   a plurality of vibration sensors fitted to said side of said casing, said plurality of vibration sensors being arranged adjacent to said coil and said rotary shaft, wherein said control unit is operable to receive displacement signals sent from said plurality of vibration sensors to thereby detect vibrations, and to control an exciting current supplied to said coil to control vibration of said rotary shaft.

3. The microgravitational rotating apparatus of claim 2, wherein said vibration sensors are fitted to both a side of said casing and said rotary shaft.

4. The microgravitational rotating apparatus of claim 2, wherein said rotator supporting mechanism further comprises:
   a distance sensor fitted to said side of said casing, wherein said control unit is operable to measure a distance between said rotary shaft and said distance sensor to actively control vibration of said rotary shaft.

5. The microgravitational rotating apparatus of claim 4, wherein said rotator supporting mechanism further comprises:
   an optical sensor or a laser displacement gauge fitted to said side of said casing, wherein said control unit, based on signals from any of said distance sensor, said optical sensor and said laser displacement gauge, is operable to measure the distance to said rotary shaft or the displacement of said rotary shaft to detect a vibration of said rotary shaft, is operable to compare a spectrum of the detected vibration with a predetermined spectrum demand value, and is further operable to control the current supplied to said coil to suppress the vibration of said rotary shaft below said spectrum demand value.

6. The microgravitational rotating apparatus of claim 2, wherein said rotator supporting mechanism further comprises:
   an optical sensor or a laser displacement gauge fitted to said side of said casing, wherein said control unit is operable to measure a distance between said rotary shaft and said optical sensor or said laser displacement gauge and is further operable to control the current supplied to said coil to actively control vibration of said rotary shaft.

7. The microgravitational rotating apparatus of claim 2, wherein said control unit is operable to detect a vibration of said rotary shaft by receiving displacement signals from said plurality of vibration sensors, is operable to compare the vibration with a predetermined vibration demand value, and is further operable to control the current supplied to said coil in order to suppress the vibration below said vibration demand value.

8. The microgravitational rotating apparatus of claim 2, wherein if said control unit detects vibration characteristics that exceed a demand value, said control unit is operable to control vibration of said rotary shaft so that the vibration is suppressed below said demand value corresponding to a vibration range that exceeds said demand value.

9. The microgravitational rotating apparatus of claim 2, wherein if said control unit detects vibration characteristics that exceed a demand value, said control unit is operable to control vibration of said rotary shaft so that the vibration is suppressed below said demand value corresponding to a vibration range that exceeds said demand value and is operable to simultaneously store data containing the vibration characteristics that exceed said demand value to incorporate the stored data into a control law that enables subsequent active vibration controls.

10. The microgravitational rotating apparatus of claim 2, wherein if said control unit detects vibration characteristics that exceed a demand value, said control unit is operable to control vibration of said rotary shaft so that the vibration is suppressed below said demand value corresponding to a vibration range that exceeds said demand value and is operable to simultaneously compare data containing the vibration characteristics that exceed said demand value with previously stored vibration data to determine a cause of the vibration.

11. The microgravitational rotating apparatus of claim 2, wherein if said control unit detects vibration characteristics that exceed a demand value, said control unit is operable to control vibration of said rotary shaft so that the vibration is suppressed below said demand value corresponding to a vibration range that exceeds said demand value and is operable to simultaneously compare data containing the vibration characteristics that exceed said demand value with previously stored vibration data to determine a cause of the vibration and incorporate the cause into a control law stored in said control unit.

12. The microgravitational rotating apparatus of claim 2, wherein said magnetic bearing supports both ends of said rotary shaft, said magnetic bearing comprising:
   a vibration control magnetic bearing; and
   a bias control magnetic bearing operable to provide a position-holding force on said rotary shaft.

13. The microgravitational rotating apparatus of claim 12, wherein said vibration control magnetic bearing is operable to effect vibration control of said rotary shaft, and said bias control magnetic bearing is operable to effect position control and position holding of said rotary shaft so as to weaken the position-holding force while said vibration control magnetic bearing is effecting the vibration control.

14. The microgravitational rotating apparatus of claim 2, wherein said magnetic bearing supports both ends of said rotary shaft, said magnetic bearing comprising:
   a first vibration control magnetic bearing;
   a second vibration control magnetic bearing; and
   a bias control magnetic bearing arranged between said first and second vibration control magnetic bearings.

15. The microgravitational rotating apparatus of claim 2, wherein said magnetic bearing supports both ends of said rotary shaft, said magnetic bearing comprising:
   a vibration control magnetic bearing;
   two bias control magnetic bearings, said vibration control magnetic bearing being arranged between said two bias control magnetic bearings.

16. The microgravitational rotating apparatus of claim 2, wherein said magnetic bearing supports both ends of said rotary shaft, said rotator supporting mechanism further comprising:
   an elastic support mechanism arranged on an outer circumferential side of said magnetic bearing for supporting said magnetic bearing at said side of said casing, a shaft supporting force of said elastic support mechanism being less than a shaft supporting force of said magnetic bearing.

17. The microgravitational rotating apparatus of claim 16, wherein said elastic support mechanism comprises:
   a main body holding said magnetic bearing for supporting said rotary shaft; and
   a plurality of springs connecting an outer circumferential surface of said main body and said side of said casing.

18. The microgravitational rotating apparatus of claim 16, wherein said elastic support mechanism comprises:
   a main body holding said magnetic bearing for supporting said rotary shaft; and
   an elastic member connecting an outer circumferential surface of said main body and said side of said casing, said elastic member being formed of an elastic material.

19. The microgravitational rotating apparatus of claim 1, wherein said bearing supports both ends of said rotary shaft and includes a vibration control coil arranged around said rotary shaft such that a gap of a predetermined size is maintained between said rotary shaft and said vibration control coil, said rotator support mechanism further comprising:
   a plurality of vibration sensors fitted to a side of said casing adjacent to said vibration control coil and being equally spaced around said rotary shaft so that a gap of a predetermined size is maintained between said rotary shaft and said plurality of vibration sensors, wherein said control unit is operable to receive displacement signals sent from said plurality of vibration sensors, and if said displacement signals exceed a predetermined value, said control unit is operable to control an exciting current supplied to said vibration control coil by sending out signals of which amplitude is changed by combining a linear signal and a non-linear signal corresponding to sizes of said displacement signals in order to effect an active vibration control of said rotary shaft.

20. The microgravitational rotating apparatus of claim 19, wherein said bearing is a magnetic bearing including said vibration control coil.

21. The microgravitational rotating apparatus of claim 20, wherein said magnetic bearing includes coil portions divided corresponding to a number and a position of said plurality of vibration sensors, and wherein said control unit is operable to control the current supplied to each of said coil portions corresponding to a location of each of said vibration sensors determined by said control unit to be generating the largest displacement signal.

22. The microgravitational rotating apparatus of claim 19, wherein said vibration control coil includes coil portions divided corresponding to a number and a position of said plurality of vibration sensors, and wherein said control unit is operable to control the current supplied to each of said coil portions corresponding to a location of each of said vibration sensors determined by said control unit to be generating the largest displacement signal.

23. The microgravitational rotating apparatus of claim 22, wherein said control unit is operable to measure time-wise changes of the displacement signals sent from said plurality of vibration sensors, operable to compute a change rate and an inclination of the changes of the respective time-wise changes and, based on the results, is operable to control the current supplied to said magnetic bearing so as to effect the vibration control of said rotary shaft.

24. The microgravitational rotating apparatus of claim 1, wherein said bearing is a magnetic bearing including a coil fitted to a side of said casing so as to be arranged adjacent to said rotary shaft, said rotator supporting mechanism further comprising:
    a plurality of vibration sensors fitted to said rotary shaft, said plurality of vibration sensors being arranged adjacent to said coil, wherein said control unit is operable to receive displacement signals sent from said plurality of vibration sensors to thereby detect vibrations, and to control an exciting current supplied to said coil to control vibration of said rotary shaft.

25. The microgravitational rotating apparatus of claim 1, wherein said bearing is a magnetic bearing including a coil fitted to a side of said casing so as to be arranged adjacent to said rotary shaft, said rotator supporting mechanism further comprising:
    a distance sensor fitted to said side of said casing, wherein said control unit is operable to measure a distance between said rotary shaft and said distance sensor to actively control vibration of said rotary shaft.

* * * * *